United States Patent
Newman et al.

(10) Patent No.: US 10,003,182 B2
(45) Date of Patent: Jun. 19, 2018

(54) COVERS FOR DISTRIBUTION LINES AND INSULATORS

(71) Applicant: Tyco Electronics Corporation, Berwyn, PA (US)

(72) Inventors: John Newman, Fuquay Varina, NC (US); Lee Evans, Morrisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 845 days.

(21) Appl. No.: 14/561,827

(22) Filed: Dec. 5, 2014

(65) Prior Publication Data

US 2015/0162734 A1 Jun. 11, 2015

Related U.S. Application Data

(60) Provisional application No. 61/912,194, filed on Dec. 5, 2013.

(51) Int. Cl.
*H02G 7/00* (2006.01)
*H01B 17/00* (2006.01)

(52) U.S. Cl.
CPC ............ *H02G 7/00* (2013.01); *H01B 17/00* (2013.01)

(58) Field of Classification Search
CPC .. H02G 7/00; H02G 7/05; H02G 7/005; H02G 7/20; H01B 17/00; H01B 17/005; H01B 17/02; H01B 17/06; H01B 17/16; H01B 17/56; H01R 4/70
USPC ............ 174/138 F, 138 G, 40 R, 137 R, 178, 174/5 RM, 138 R, 5 R; 361/626, 600, 361/601; 248/49; 52/101
See application file for complete search history.

(56) References Cited

U.S. PATENT DOCUMENTS

| | | | |
|---|---|---|---|
| 3,079,457 A | 2/1963 | Newcomb, Jr. | |
| 5,873,324 A * | 2/1999 | Kaddas ................. | A01K 15/02 119/174 |
| 6,730,852 B1 | 5/2004 | Puigcerver et al. | |
| 6,812,400 B1 | 11/2004 | Lynch | |
| 7,154,034 B2 | 12/2006 | Lynch | |
| 7,154,036 B2 | 12/2006 | Lynch | |
| 7,297,869 B2 | 11/2007 | Hiller et al. | |
| 7,834,269 B2 * | 11/2010 | Niles ....................... | H02G 7/00 174/84 R |
| 8,067,691 B2 | 11/2011 | Puigcerver et al. | |

(Continued)

FOREIGN PATENT DOCUMENTS

| | | |
|---|---|---|
| DE | 8523201 U1 | 10/1985 |
| DE | 8914320 U1 | 3/1990 |

(Continued)

*Primary Examiner* — Angel R Estrada
(74) *Attorney, Agent, or Firm* — Myers Bigel, P.A.

(57) ABSTRACT

A cover assembly for an insulator and first and second conductor portions extending therefrom includes first and second coupled hub members defining a central cavity sized and configured to receive the insulator. The first hub member includes a first leg defining a first lengthwise cavity extending from the central cavity and configured to receive the first conductor portion. The second hub member includes a second leg defining a second lengthwise cavity extending from the central cavity and configured to receive the second conductor portion. The first and second hub members are configured to be slidably rotated relative to one another to selectively adjust an angle between the first and second legs.

19 Claims, 21 Drawing Sheets

(56) References Cited

U.S. PATENT DOCUMENTS

| | | |
|---|---|---|
| 8,156,693 B2 | 4/2012 | Lynch |
| 8,225,558 B2 | 7/2012 | Lynch |
| 8,618,412 B2 | 12/2013 | Lynch |
| 9,608,424 B2 * | 3/2017 | Williams ................. H02G 7/00 |
| 9,741,476 B2 * | 8/2017 | Hiller .................... H01B 17/00 |
| 2012/0279778 A1 | 11/2012 | Lynch |
| 2013/0264097 A1 | 10/2013 | Lynch |
| 2014/0034380 A1 | 2/2014 | Lynch |
| 2014/0262435 A1 | 9/2014 | Miller et al. |
| 2014/0262485 A1 | 9/2014 | Miller et al. |

FOREIGN PATENT DOCUMENTS

| | | |
|---|---|---|
| DE | 4115866 A1 | 11/1992 |
| DE | 9414366 U1 | 10/1994 |
| DE | 29815864 U1 | 11/1998 |
| TW | 501815 U | 9/2002 |

* cited by examiner

COVERS FOR DISTRIBUTION LINES AND INSULATORS

RELATED APPLICATION

This application claims priority from U.S. Provisional Application No. 61/912,194, filed Dec. 5, 2013, the disclosure of which is hereby incorporated herein in its entirety.

BACKGROUND

Support structures, such as utility poles, are often used to suspend electrical lines, such as power distribution lines, above the ground. These support structures are generally located outdoors and may be of a variety of different configurations to suspend one or more lines. One problem with such lines, particularly where the lines are power distribution lines that transmit electrical power at high voltages, is that birds or other animals may land or climb onto the lines. Such contact of distribution lines by animals, particularly adjacent the support structure, may result in a shock to the animal, possibly resulting in the death of the animal, if the animal causes a short or electrical flashover allowing current to flow through the animal.

For example, it is known that birds from time to time perch on support structures such as utility poles. For certain birds, their wing span is great enough to contact two parallel lines or otherwise create an electrical flashover during take off or landing. In addition to harming the bird, such an electrical flashover can also cause a power outage or other problem with the power distribution system.

SUMMARY

Some embodiments of the present invention are directed to a cover assembly for an insulator and first and second conductor portions extending therefrom. The cover assembly includes first and second coupled hub members defining a central cavity sized and configured to receive the insulator. The first hub member includes a first leg defining a first lengthwise cavity extending from the central cavity and configured to receive the first conductor portion. The second hub member includes a second leg defining a second lengthwise cavity extending from the central cavity and configured to receive the second conductor portion. The first and second hub members are configured to be slidably rotated relative to one another to selectively adjust an angle between the first and second legs.

In some embodiments, a top wall of the first hub member is coupled to a top wall of the second hub member with the coupled top walls overlying the central cavity. The second hub member may include a plurality of standoff members extending downwardly from the top wall, with at least some of the standoff members configured to rest on the insulator. At least some of the standoff members may include an inner portion and an outer portion, wherein the outer portion extends downwardly from the top wall a greater distance than the inner portion. The standoff members may include aligned notches defined therein, with the notches defining a conductor passageway through which the first and second conductor portions can pass.

The first hub member may include a hot stick engagement feature centered on a top surface of the top wall. The top surface of the top wall may be convex relative to the hot stick engagement feature.

In some embodiments, the first and second hub members each include an arcuate sidewall, and the sidewalls overlap as the first and second hub members are slidably rotated relative to one another. The first hub member may include a flange defining an arcuate groove, and a top portion of the sidewall of the second hub member may be received in the groove. The first hub member may include a stop wall at each opposite end of the groove, and the first and second hub members may be slidably rotatable relative to one another until an end portion of the sidewall of the second hub member contacts one of the stop walls of the first hub member.

In some embodiments, a first extension arm is connected to a distal end portion of the first leg, with the first extension arm defining a lengthwise cavity configured to receive the first conductor portion. The first extension arm cavity may define a longitudinal axis, and the first extension arm may be connected to the first leg with a coupling mechanism configured such that the first extension arm can be selectively rotated relative to the first leg about at least one pivot axis that is generally transverse to the longitudinal axis. A second extension arm may be connected to a distal portion of the second leg, with the second extension arm defining a lengthwise cavity configured to receive the second conductor portion.

In some embodiments, the first and second hub members are configured to be slidably rotated relative to one another to selectively adjust an angle between the first and second legs that is between about 150 degrees and 180 degrees. In some embodiments, the first and second hub members are each unitarily formed.

Some other embodiments of the present invention are directed to a method for covering an insulator and first and second conductor portions extending therefrom. The method includes providing a cover including first and second coupled hub members defining a central cavity. The first hub member includes a first leg defining a first lengthwise cavity extending from the central cavity and the second hub member includes a second leg defining a second lengthwise cavity extending from the central cavity. The first and second hub members are rotatable relative to one another. The method includes rotating the first and second hub members relative to one another such that the first leg generally aligns with the first conductor portion and the second leg generally aligns with the second conductor portion. The method includes moving the cover downward to receive the insulator and the first and second conductor portions in the cover.

In some embodiments, the method includes: receiving the insulator in the central cavity; receiving the first conductor portion in the first leg cavity; and receiving the second conductor portion in the second leg cavity.

Some other embodiments of the present invention are directed to cover assembly for first and second spaced apart insulators. The cover assembly includes an elongated housing, first hub member rotatably coupled to a first end portion of the housing, and a second hub member rotatably coupled to a second, opposite end portion of the housing. The first hub member includes a first hub cavity sized and configured to receive the first insulator. The first hub member also includes a first leg defining a first lengthwise cavity extending from the first hub cavity and configured to receive a first conductor portion extending from the first insulator. The second hub member includes a second hub cavity sized and configured to receive the second insulator. The second hub member also includes a second leg defining a second lengthwise cavity extending from the second hub cavity and configured to receive a second conductor portion extending from the second insulator.

The first and second hub members may each include a plurality of standoff members in the hub cavity. At least some of the standoff members of the first hub member may be configured to rest on the first insulator, and at least some of the standoff members of the second hub members may be configured to rest on the second insulator.

In some embodiments, the housing defines a housing longitudinal axis, the first hub member defines a first hub member longitudinal axis, and the second hub member defines a second hub member longitudinal axis. The first hub member may be configured to be slidably rotated relative to the housing to selectively adjust an angle between the first hub member longitudinal axis and the housing longitudinal axis. The second hub member may be configured to be slidably rotated relative to the housing to selectively adjust an angle between the second hub member longitudinal axis and the housing longitudinal axis.

DETAILED DESCRIPTION OF EMBODIMENTS OF THE INVENTION

Figure 1:
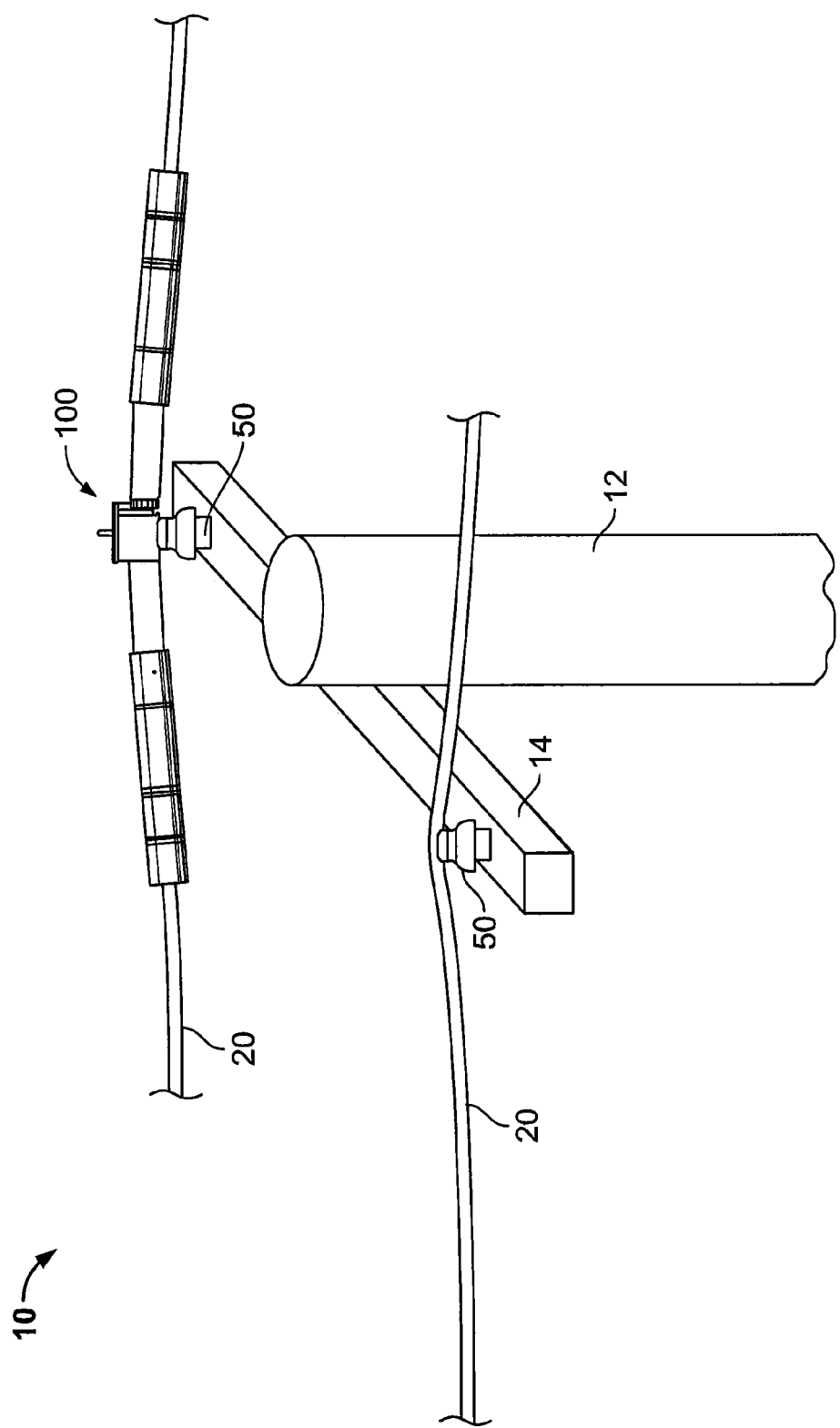
FIG. 1 is a schematic diagram illustrating a power distribution system including a conductor, an insulator and a cover assembly according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present invention are explained in detail in the specification set forth below.

With reference to FIG. 1, a protective cover assembly 100 according to embodiments of the invention is shown mounted on a power distribution system 10. The power distribution system 10 includes a utility pole 12 having a cross bar or member 14 mounted near the top of the pole 12. As illustrated, a pair of insulators 50 are fastened or otherwise attached to the cross bar 14. The insulators 50 may be made of, for example, glass, polymer, porcelain, or similar electrical insulating material.

Figure 2:
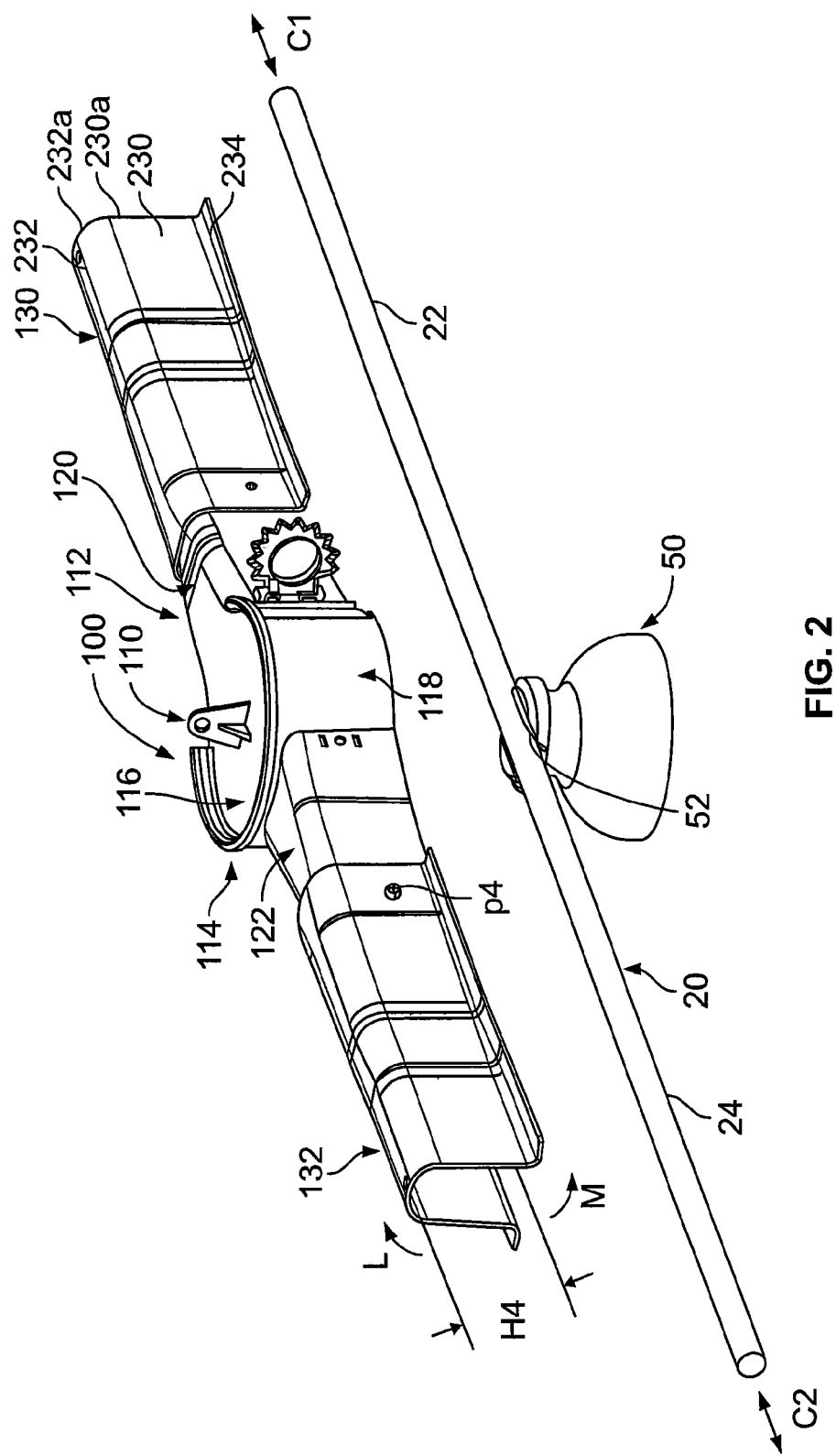
FIG. 2 is a fragmentary perspective view of the conductor, insulator and cover assembly of FIG. 1.

A conductor 20 is coupled to or contacts the insulator 50 to provide an electrically insulated attachment of the conductor 20 to the utility pole 12. As shown in FIG. 2, the conductor 20 may extend over and/or through a top portion of the insulator 50 (e.g., through a groove or slot 52 formed in the top portion of the insulator 50).

A first length or portion 22 of the conductor 20 extends from the insulator 50 in a first direction and a second length or portion 24 of the conductor 20 extends from the insulator 50 in a second direction. An axis C1 defined by the first conductor length 22 and an axis C2 defined by the second conductor length 24 may not coincide or be parallel to one another. That is, although the first and second conductor lengths 22, 24 may be in substantially straight or co-axial alignment (as illustrated in FIG. 2), the conductor lengths 22, 24 may also extend in different directions from the insulator 50 to define an angle therebetween (e.g., an angle that is less than or substantially less than 180 degrees).

Figure 3:
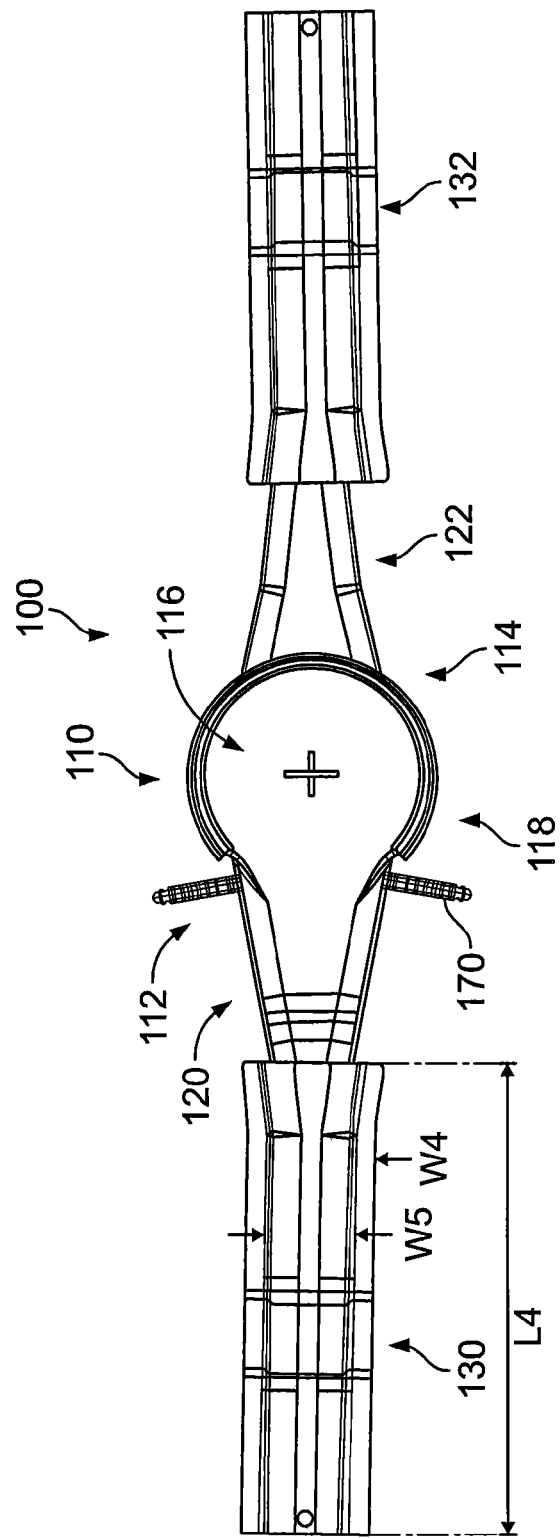
FIG. 3 is a top view of the cover assembly of FIG. 1.
Figure 4:
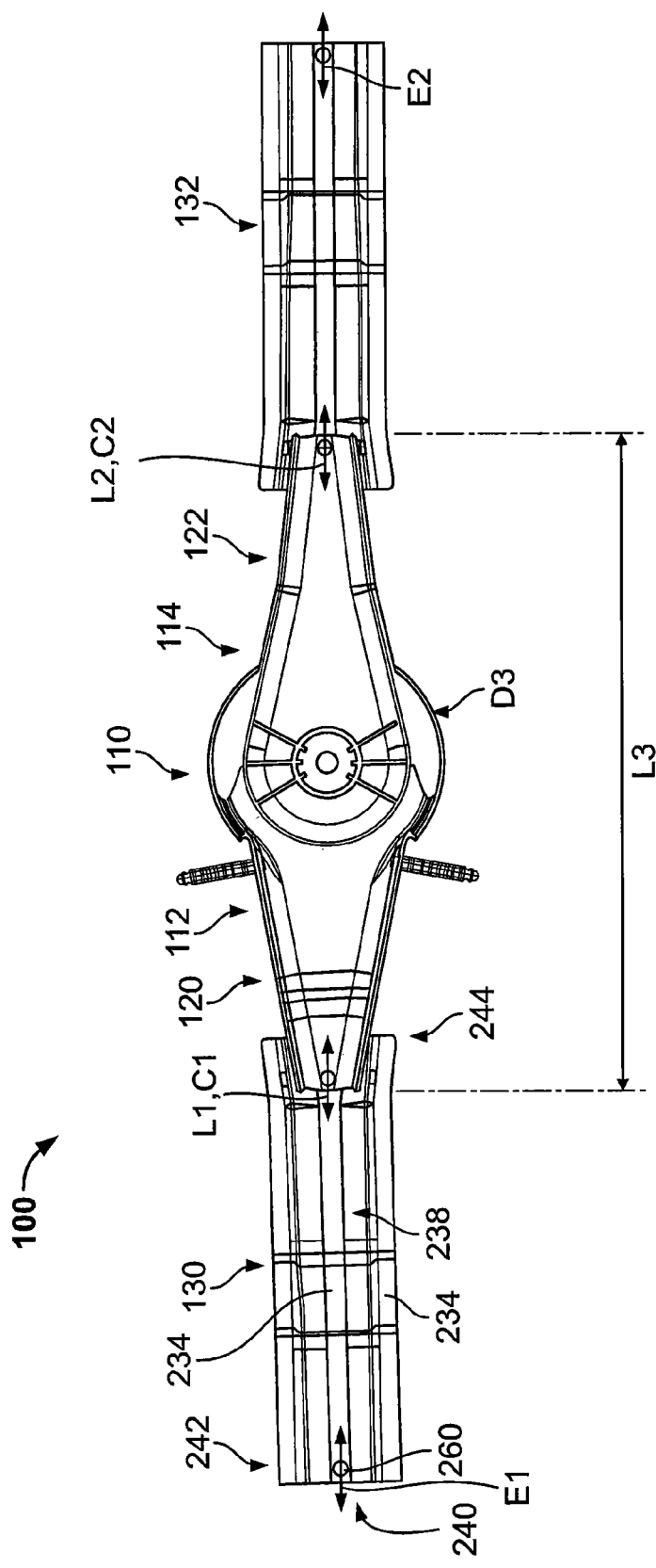
FIG. 4 is a bottom view of the cover assembly of FIG. 1.

Turning to the protective cover assembly 100 in more detail and as seen in FIGS. 2-4, the cover assembly 100 includes a cover hub assembly 110 having a first hub member 112 and a second hub member 114. The first hub member 112 includes a central hub or central hub portion 116 and a laterally extending leg or leg portion 120. The leg 120 defines a longitudinal axis L1 (FIG. 4). The second hub member 114 includes a central hub or central hub portion 118 and a laterally extending leg or leg portion 122. The leg 122 defines a longitudinal axis L2 (FIG. 4). The axes L1, L2 may also be referred to as conductor exit axes C1, C2.

In some embodiments, the first and second hub members 112, 114 are discrete members. In some embodiments, the first and second hub members 112, 114 are separately formed.

An extension or extension arm 130 is connected to a distal end portion of the leg 120 and an extension or extension arm 132 is connected to a distal end portion of the leg 122. The extension arm 130 defines a longitudinal axis E1 and the extension arm 132 defines a longitudinal axis E2 (FIG. 4).

The hub assembly 110 is shown in more detail in FIGS. 5-8. The central hub portion 116 of the first hub member 112 includes a top wall 140 and a pair of arcuate hub sidewalls 142 extending downwardly from the top wall 140. Each sidewall 142 has a lower edge 142a. An arcuate lip 144 extends upwardly from the top wall 140. The lip 144 in part defines a flange 146, which in turn defines an arcuate slot 148. A stop wall 150 is provided at each opposite end of the slot 148.

Figure 6:
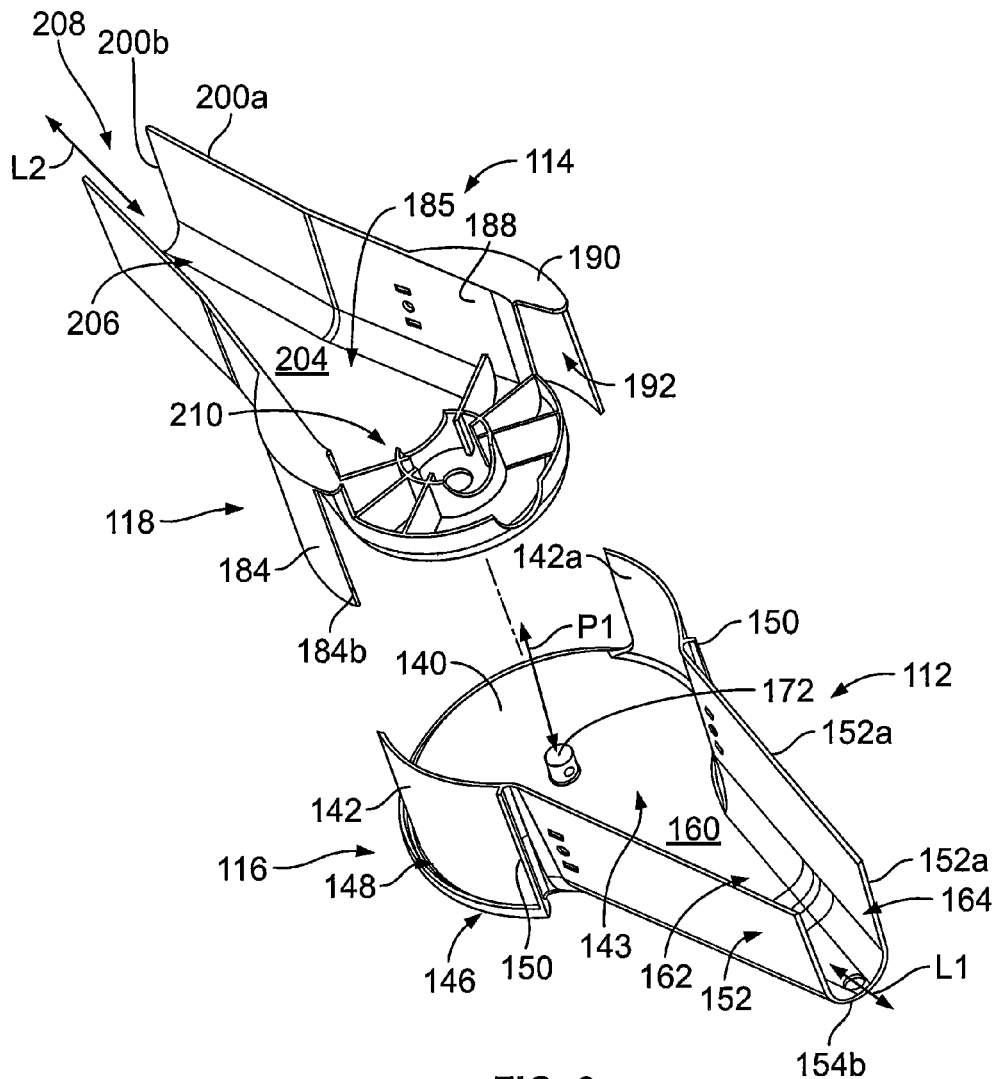
FIG. 6 is an exploded, bottom perspective view of the hub assembly of FIG. 5.

The leg portion 120 has a pair of spaced apart sidewalls 152. A connecting wall 154 connects top edges of the sidewalls 152. The connecting wall 154 may be generally arcuate and may include a generally flat top portion 156. The sidewalls 152 and the connecting wall 154 define a cavity 160 (FIG. 6). Lower edges 152a of the sidewalls 152 define a lower opening 162 that communicates with the cavity 160. Ends 152b of the sidewalls 152 and an end 154b of the connecting wall 154 define an end opening 164 that also communicates with the cavity 160.

The sidewalls 152 converge as they extend away from the central hub portion 116. As a result, a width of the channel 160 and the lower opening 162 decreases along the axis L1 from the central hub portion 116 to the end opening 164.

Figure 5:
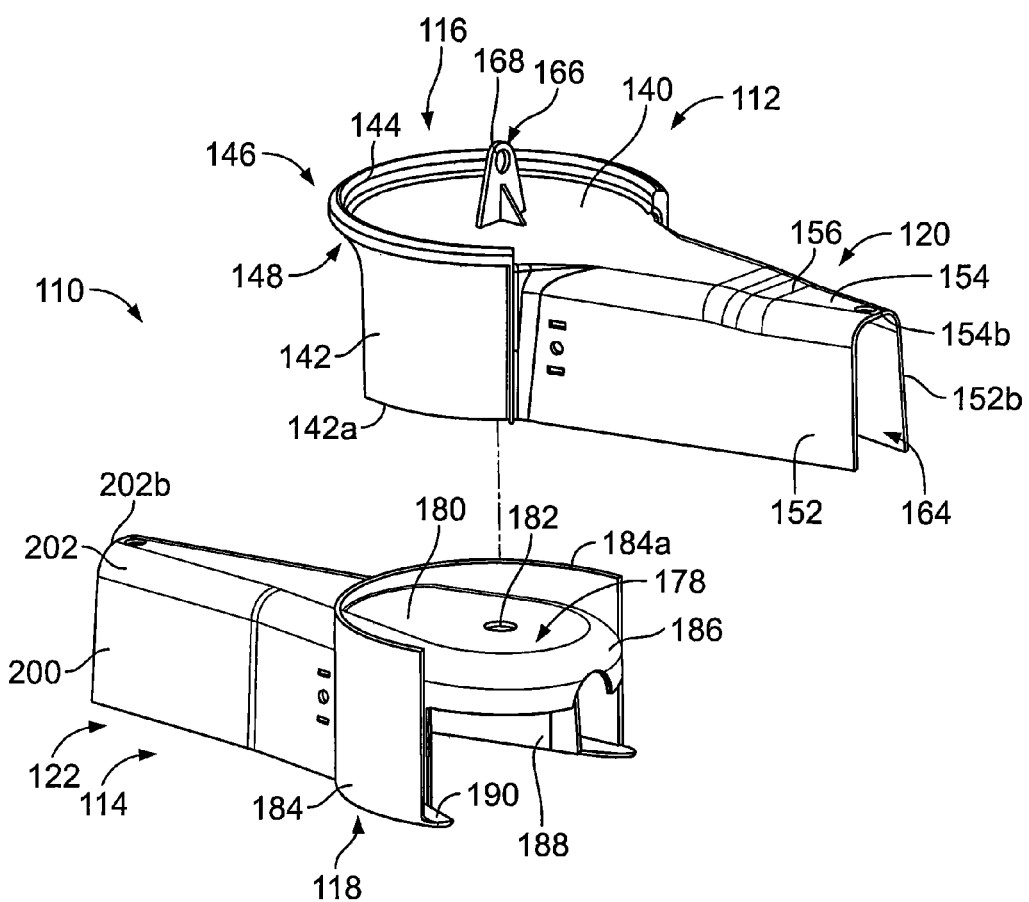
FIG. 5 is an exploded, top perspective view of a hub assembly of the cover assembly of FIG. 1.

A hook loop 166 extends from an upper portion of the top wall 140 of the first hub member 112 (FIG. 5). The hook loop 166 includes an aperture 168 for receiving a hook of a hot stick (e.g., a shotgun hot stick). The hook loop 166 is centrally located on the top wall 140. Other hot stick engagement features may be provided. For example, as shown in FIGS. 2 and 3, a spur 170 may be provided on each side of the first hub member 112. Additionally or alternatively, one or more hot stick engagement features may be provided on the second hub member 114.

A pin or post 172 extends from a lower portion of the top wall 140 of the first hub member 112. The pin 172 is sized and configured to be received in an aperture or passageway of the second hub member 114, as will be described below. The pin 172 defines a pivot axis P1. The first and second hub members can be rotatably coupled such that they rotate relative to one another about the pivot axis P1, as will also be described below. In some embodiments, the pivot axis P1 is transverse, and in some embodiments perpendicular, to the conductor exit axes C1, C2. In some embodiments, the pivot axis P1 is constrained to be transverse to the conductor exit axes C1, C2.

The central hub portion 118 of the second hub member 114 includes a ledge 178. The ledge 178 has a top wall 180 with an aperture 182 defined therein. The aperture 182 is sized and configured to receive the pin 172 of the first hub member 112. In some embodiments, the aperture 182 is sized and configured to provide an interference fit between the pin 172 and the aperture 182 so that the aperture 182 grips the pin 172. In other embodiments, the pin 172 fits within the aperture 182 without an interference fit. A cotter pin or the like may extend through the pin 172 to secure the pin 172.

The central hub portion 118 has a hub sidewall 184 that partially surrounds the ledge 178. The ledge 178 has a downwardly extending, generally arcuate sidewall 186. Inner sidewalls 188 extend downwardly from the ledge sidewall 186 on opposing sides of the ledge 178. A connecting wall or floor 190 connects each hub sidewall 184 with a respective one of the inner sidewalls 188. The hub sidewall 184, the inner sidewall 188 and the connecting wall 190 define an opening 192.

When the first and second hub members 112, 114 are connected, the hub sidewalls 142 of the first hub member 112 are received in the openings 192 of the second hub member 114. The pin 172 of the first hub member 112 is received in the aperture 182 of the second hub member 114. The hub sidewall 184 of the second hub member 114 has a top end 184a that is received in the arcuate slot 148 of the first hub member 112. When connected, the first and second hub members 112, 114 (e.g., the central hub portions 116, 118) define a hub cavity 193c and a hub opening 193o that communicates with the hub cavity (FIG. 8).

Figure 7:
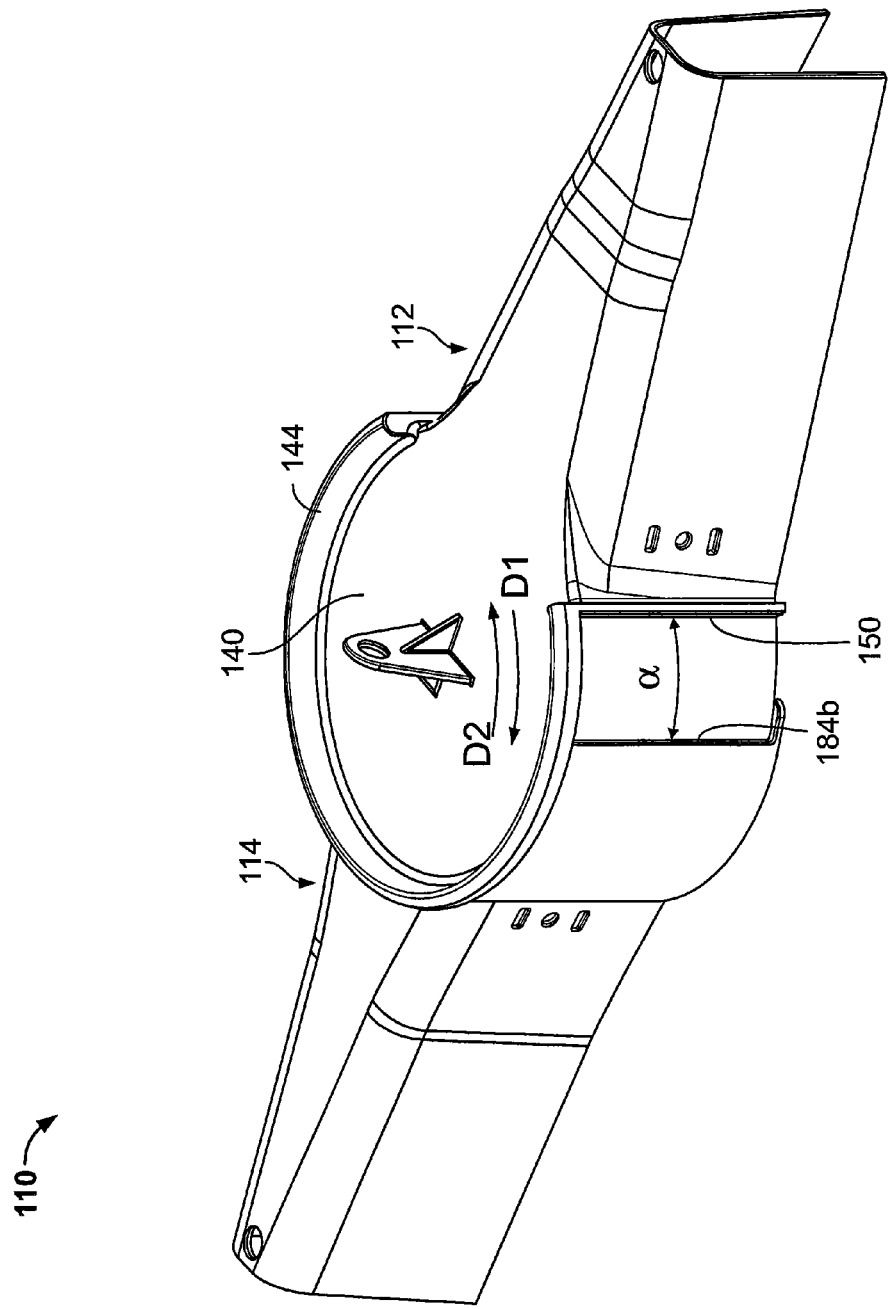
FIG. 7 is top perspective view of the hub assembly of FIG. 5 as assembled.
Figure 8:
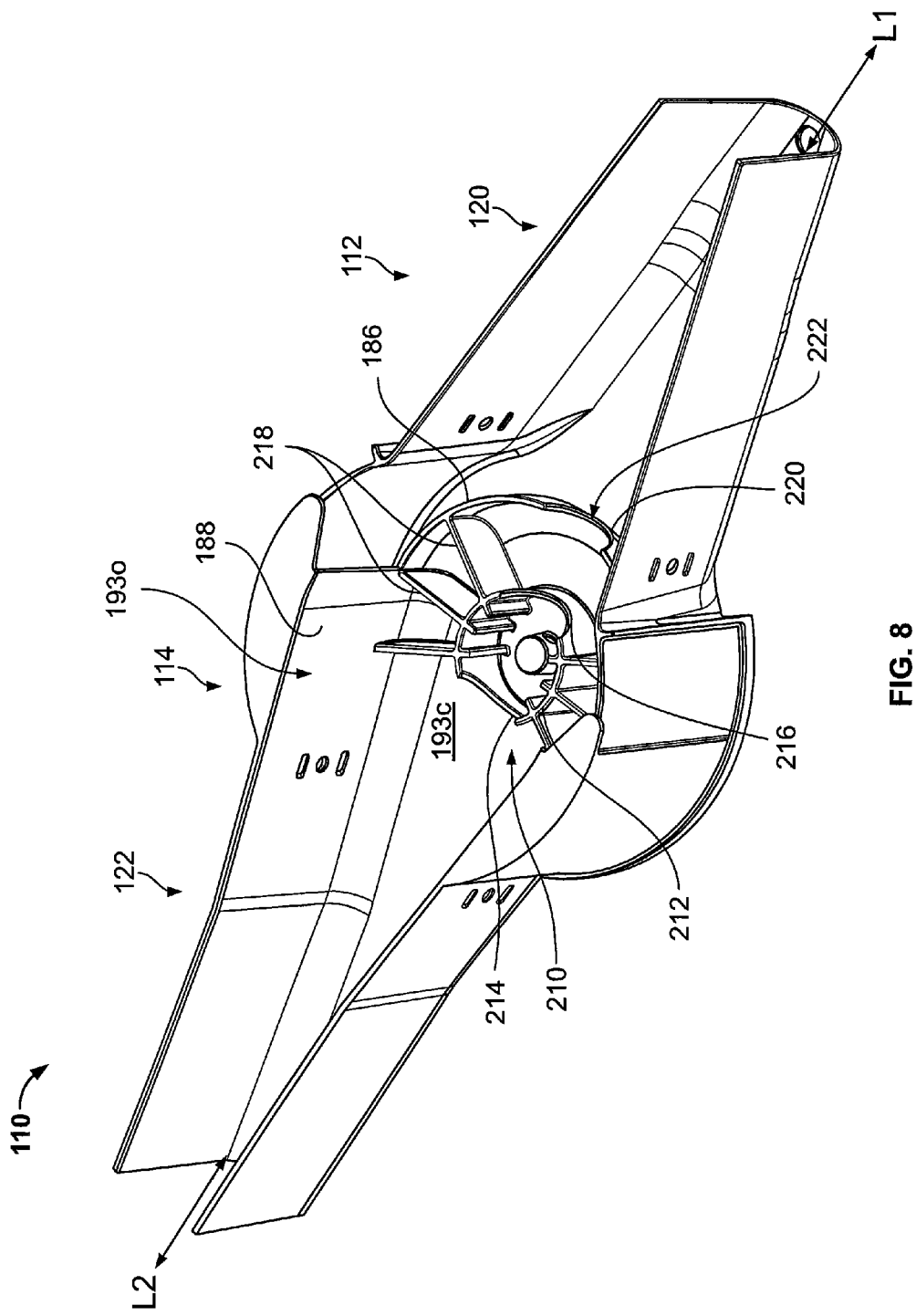
FIG. 8 is bottom perspective view of the hub assembly of FIG. 5 as assembled.

FIGS. 7 and 8 illustrate first and second hub members 112, 114 pivotably or rotatably connected to each other. As illustrated, the hub assembly 110 is in an aligned or straight configuration/position. That is, the longitudinal axis L1 defined by the leg 120 substantially coincides with the longitudinal axis L2 defined by the leg 122 (FIG. 8).

The first and second hub members 112, 114 can be slidably rotated relative to one another, e.g., to accommodate a conductor diverging from an insulator at various angles. Referring to FIG. 7, the hub assembly 110 can be rotated until one of the hub sidewall ends 184b of the second hub member 114 abuts or contacts one of the stop walls 150 of the first hub member 112. As illustrated, the hub assembly can be rotated up to an angle α in either direction D1, D2 from the aligned or straight position. Therefore, the legs 120, 122 and, when connected, the extension arms 130, 132 can be rotated relative to one another at any angle up to the angle α. In some embodiments, the angle α is between about 15 and 45 degrees. In some embodiments, the angle α is about 30 degrees.

The first and second hub members 112, 114 are rotatable such that the sidewalls 142 of the first hub member 112 and the sidewalls 184 of the second hub member 114 overlap throughout the entire range of rotation. The sidewalls 142, 184 define a cylinder with the exception of conductor openings 143, 185 (FIGS. 6 and 6). With this configuration, there is no seam defined by or in the sidewalls through which water or debris may enter.

The second hub member 114 will now be described in more detail with reference to FIGS. 5, 6 and 8. The leg 122 has a similar configuration to the leg 120 of the first hub member 112. The leg 122 has a pair of spaced apart sidewalls 200. A connecting wall 202 connects top edges of the sidewalls 200. As illustrated, the connecting wall 202 may be generally arcuate. The sidewalls 200 and the connecting wall 202 define a cavity 204 (FIG. 6). Lower edges 200a of the sidewalls 200 define a lower opening 206 that communicates with the cavity 204. Ends 200b of the sidewalls 200 and an end 202b of the connecting wall 202 define an end opening 208 that also communicates with the cavity 204.

The sidewalls 200 converge as they extend away from the central hub portion 118. As a result, a width of the cavity 204 and the lower opening 206 decreases along the axis L2 from the central hub portion 118 to the end opening 208.

An insulator engagement portion 210 is provided in the central hub portion 118. The insulator engagement portion includes standoffs 212, 218 that extend downwardly from the top wall 180 of the ledge 178 (FIG. 8). The insulator engagement portion 210 includes a center standoff 212 that may be generally circular with a pair of opposed notches 214, 216 that are aligned along the axis L2 or in a direction parallel thereto. A plurality of outer standoffs 218 extend outwardly from the center standoff 212 to the ledge sidewall 186 and/or one of the inner sidewalls 188. The center standoff 212 and the outer standoffs 218 may have a height that is substantially the same as a height of the ledge sidewall 186. As described in more detail below, the cover assembly 100 can be mounted on an insulator such that the standoffs 210 rest on a top portion or surface of the insulator. The standoffs provide clearance (e.g., an air gap) for a top running conductor (such as the conductor 20 shown in FIG. 2). The standoffs 212, 218 are also sized, positioned and configured such that they will rest on insulators with a range of different diameters.

The ledge sidewall 186 has a notch 220 defined therein. The notch 220 and the notches 214, 216 of the center standoff 212 are aligned along the axis L2 or in a direction parallel thereto. When the hub assembly 110 is in the aligned or straight position (FIG. 8), the notches 214, 216, 220 are also aligned along the axis L1 or in a direction parallel thereto. The notches 214, 216, 220 define a conductor channel 222; a conductor may extend through a portion of the channel 222 in certain conductor/insulator configurations, as described below.

Figure 9:
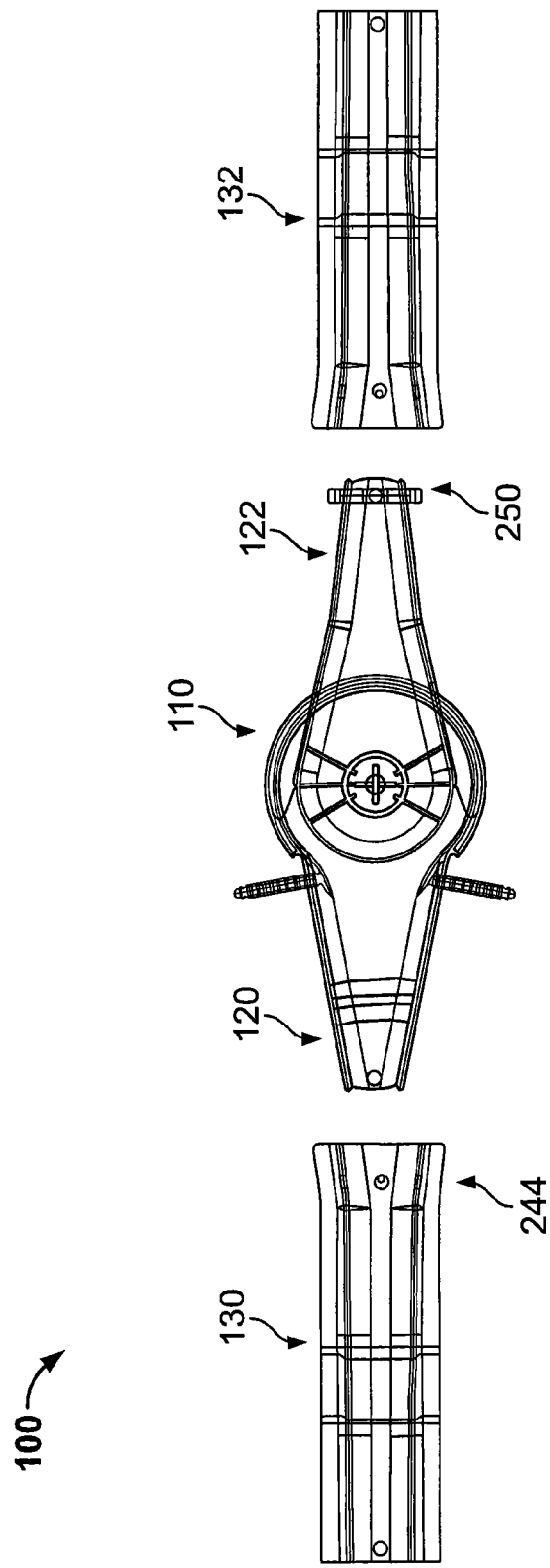
FIG. 9 is an exploded bottom view of the cover assembly of FIG. 1.

The extension arms 130, 132 will now be described in more detail with reference to FIGS. 2, 4 and 9. As illustrated, the arms 130, 132 are mirror images of one another and therefore only the arm 130 will be described in detail, it being understood that such description applies likewise to the arm 132. The arm 130 has a pair of opposed, spaced apart sidewalls 230 that generally extend along the axis E1. A connecting wall 232 (e.g., an arcuate connecting wall) extends along the axis E1 and connects top edges of the sidewalls 230. A flange 234 extends outwardly from a bottom edge of each sidewall 230. The sidewalls 230 and the connecting wall 232 form a generally U-shaped channel 236 having a lengthwise bottom opening 238 (defined by the flanges 234) and an end opening 240 at a distal portion 242 of the arm 130. A proximal portion 244 of the arm 130 is flared such that the arm 130 can fit over and connect with the leg 120 of the first hub member 112.

Figure 10:
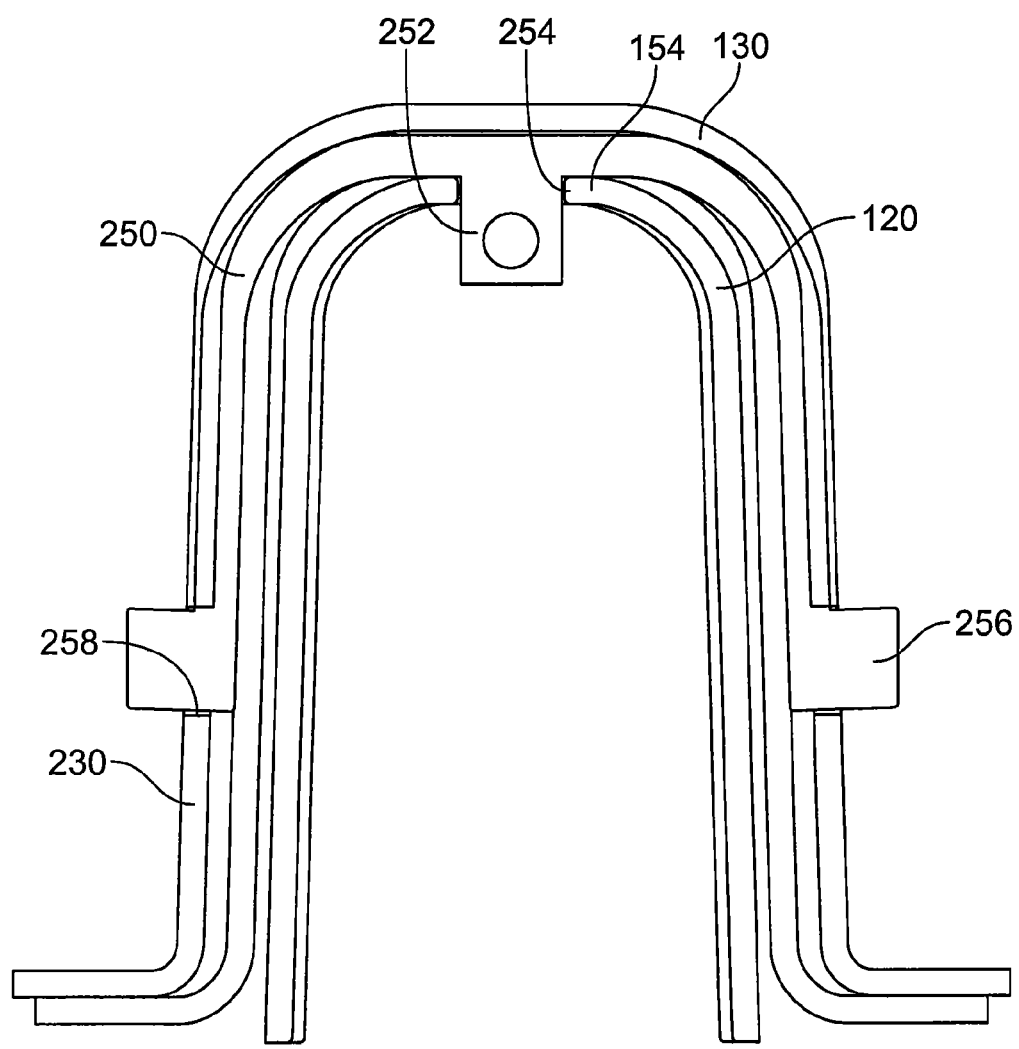
FIG. 10 is a sectional view of a coupling of the cover assembly of FIG. 1.
Figure 14:
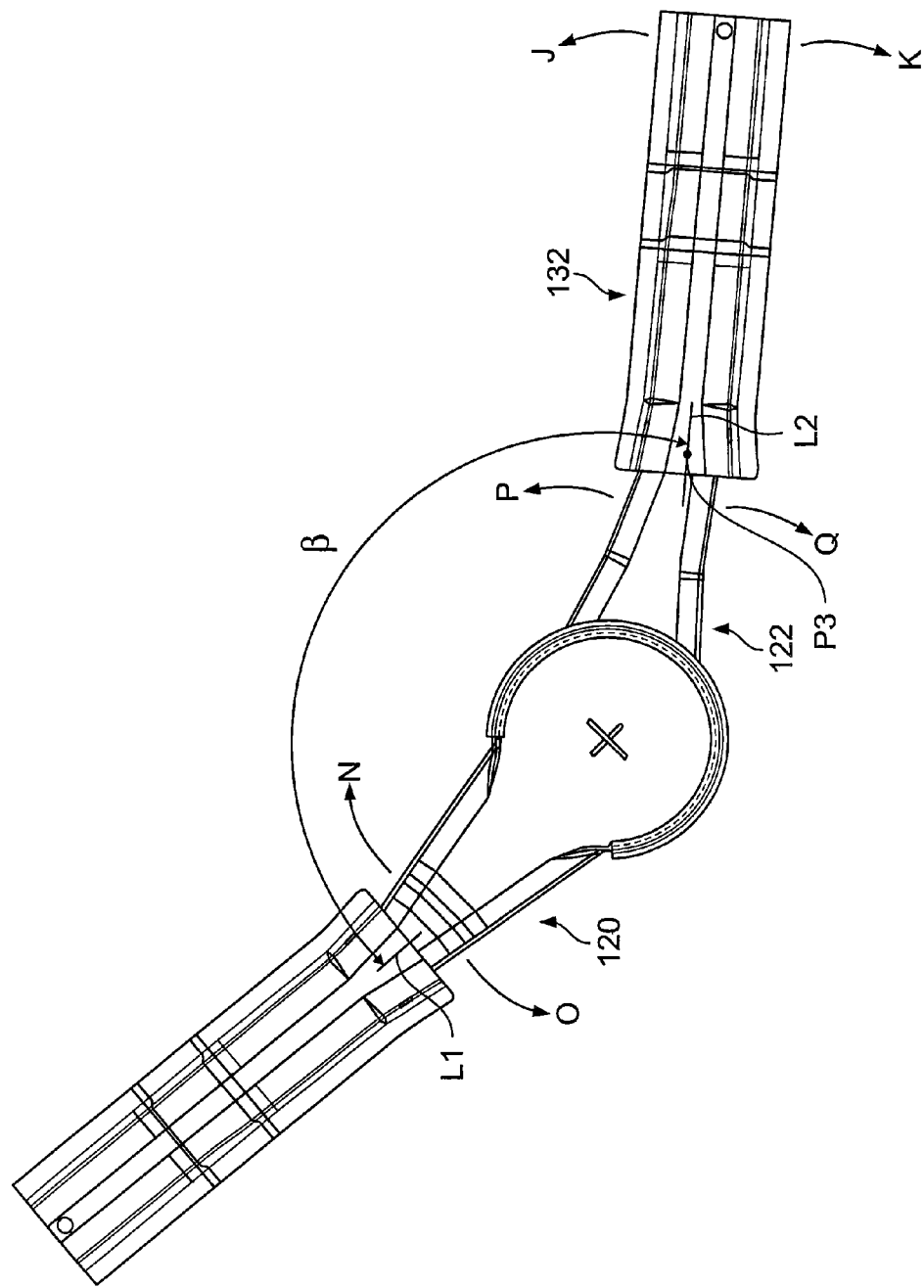
FIG. 14 is a top view of the cover assembly of FIG. 1 slidably rotated to an angled configuration.

Turning to FIG. 10, a coupling 250 is positioned between and couples the leg 120 and the extension arm 130. The coupling 250 has a post or pin 252 that is received in an aperture 254 defined in the connecting wall 154 of the leg 120. The coupling also has opposed posts or pins 256 that are received in apertures 258 in opposing sidewalls 230 of the arm 130. The coupling 250 allows for limited multi-dimensional movement or "play" between the coupled leg 120 and extension arm 130. In some embodiments, the post 252 defines a vertical pivot axis P3 about which the arm can rotate or move in directions J and K (FIG. 14, showing the arm 132). In some embodiments, the posts 256 define a horizontal pivot axis P4 about which the arm can rotate or move in directions L and M (FIG. 2, showing the arm 132).

The arm 130 is configured such that multiple arms 130 can overlap end-to-end to chain two or more arms 130 together. The distal end portion 242 of the arm 130 is sized and configured such that the proximal end portion 244 (e.g., the flared end) of another arm 130 can overlap and connect. As illustrated in FIG. 4, an aperture 260 is defined in the connecting wall 154 at the distal end portion 242 of the arm 130. An overlapping arm 130 may be fastened to the distal end portion 242 of the arm, e.g., to cover additional conductor length.

The legs 120, 122 of the hub assembly 110 and/or the extension arms 130, 132 may include attachment features for attachment of conductor connectors such as displacement spring clip type connectors, omega clip type connectors, and the like that are known to those of skill in the art. Such connectors may also be integrated with the legs 120, 122 and/or the arms 130, 132.

Figure 11:
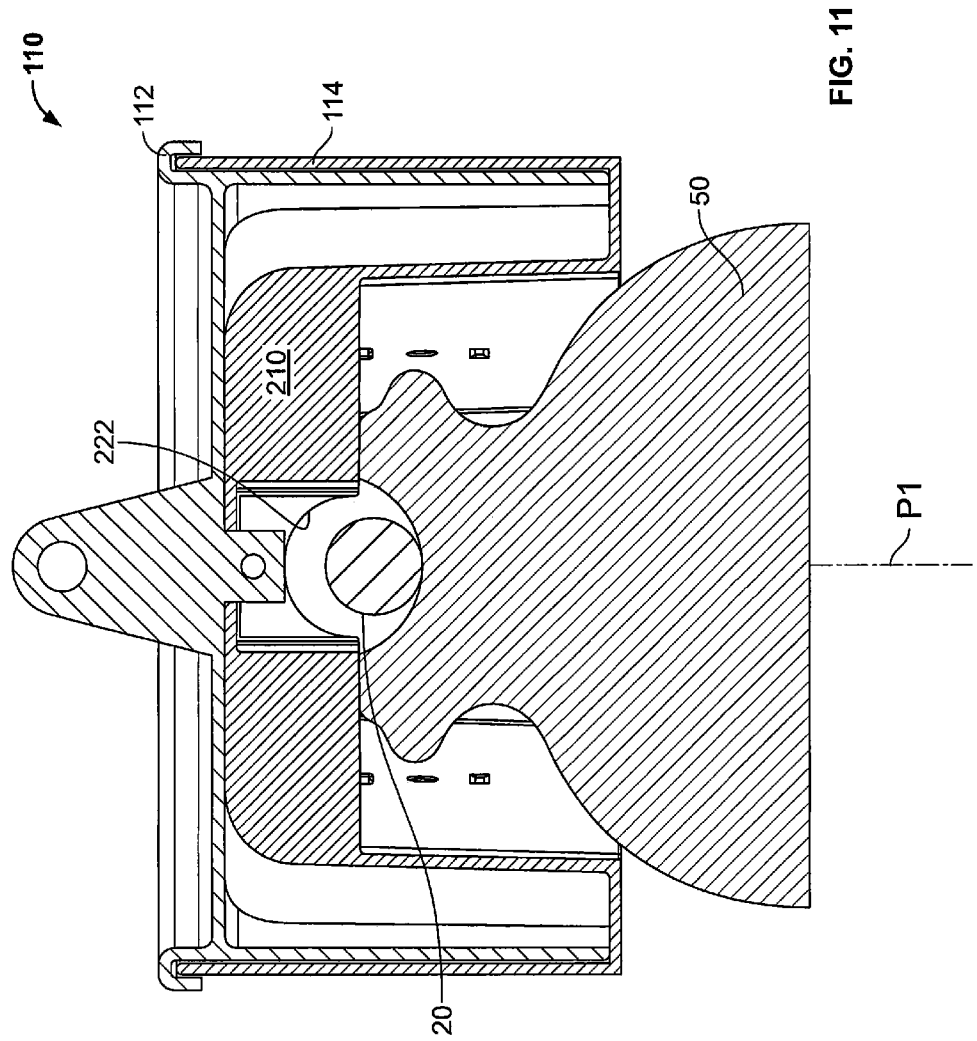
FIGS. 11-13 are sectional views of the cover assembly of FIG. 1 installed on insulators with various conductor configurations.

With reference to FIGS. 2, 8 and 11, the cover assembly 100 may be mounted on the insulator in the following manner. The cover assembly 100 is moved downwardly such that a portion of the insulator 50 is received through the hub opening 193o and into the hub cavity 193c. At least some of the standoffs 212, 218 rest on the insulator 50. Portions of the conductor lengths 22, 24 may also be received in the through the hub opening 193o and into the hub cavity 193c. More extant portions of the conductor lengths 22, 24 are received through the leg openings 162, 206 and into the leg cavities 160, 204. Where used, even more extant portions of the conductor lengths are received through the extension arm openings 238 and into the extension arm cavities 236.

As noted above, the conductor lengths 22, 24 may extend in different directions from the insulator 50. The cover assembly 100 can accommodate such configurations with the rotatable hub assembly 110. For example, the installer can rotate the hub assembly 110 prior to mounting the cover assembly 100. The hub assembly 110 may further rotate on its own as it is lowered onto the conductor/insulator. Where used, the coupling 250 may allow for additional multi-dimensional movement between the coupled leg 120 and extension arm 130. Thus, the hub assembly 110 and/or the extension arms 130, 132 may self-align during installation. In some embodiments, the pivot axis P1 may extend through the insulator 50 (e.g., the pivot axis P1 may generally coincide with a longitudinal axis of the insulator 50).

In the configuration shown in FIG. 11, the conductor 20 extends over the insulator 50. The hub assembly 110 may not need to be rotated for this configuration. The conductor 20 may extend partially through the conductor channel 222. The insulator engagement portion 210 (i.e., the standoffs 212, 218) provide clearance for the top running conductor.

Figure 12:
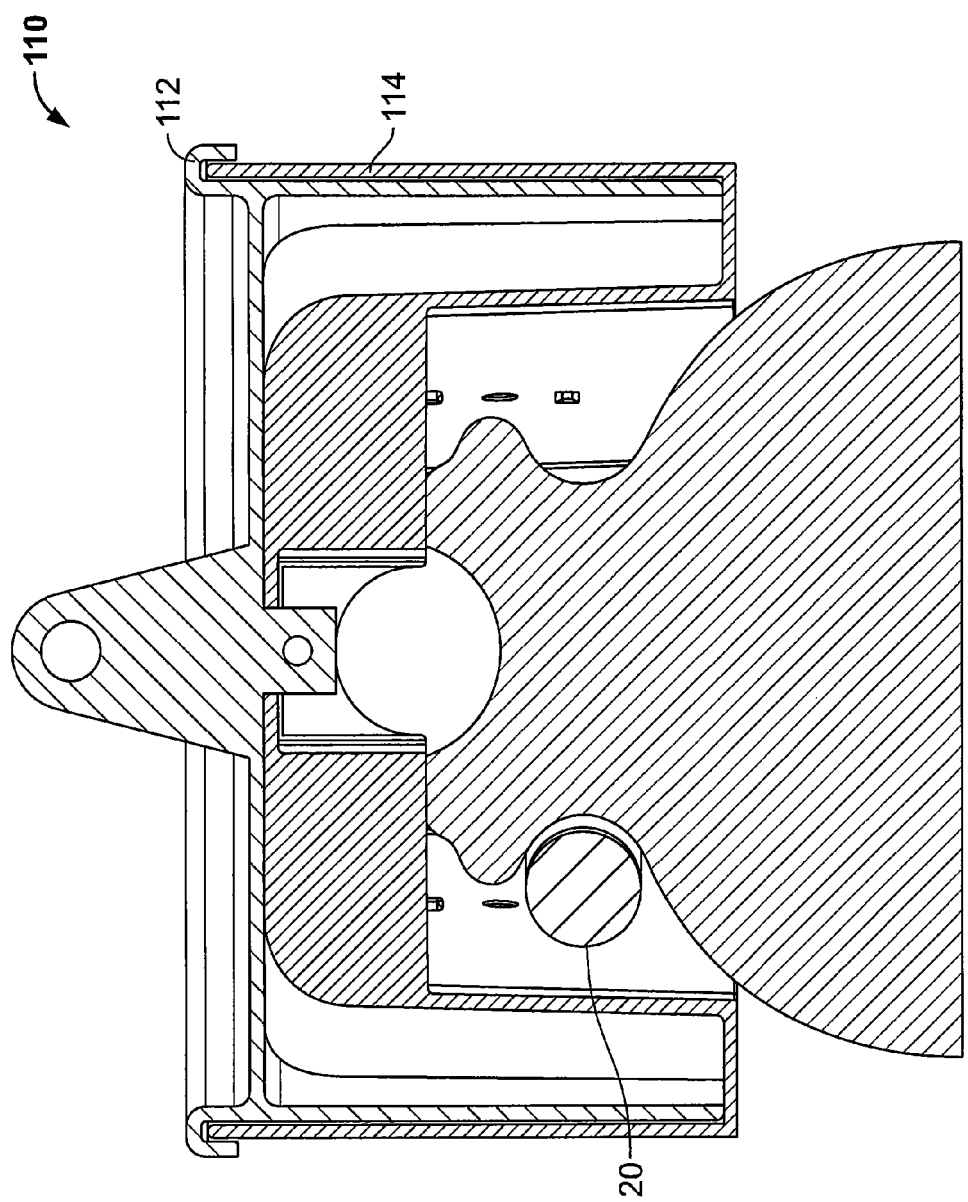
Figure 13:
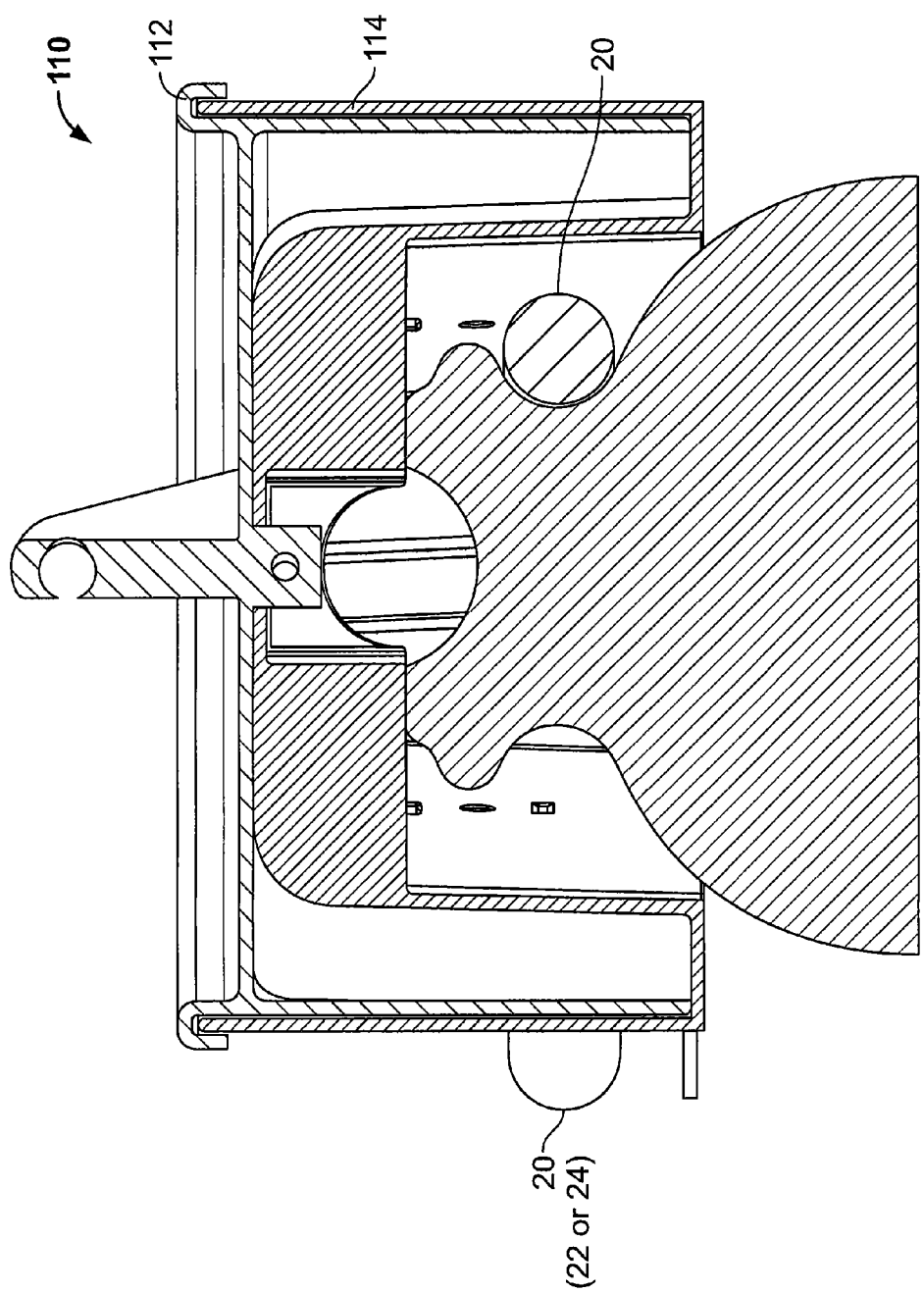

Cover assemblies according to embodiments of the invention also accommodate side tie conductor arrangements (e.g., FIG. 12) and angled tie conductor arrangements (e.g., FIG. 13). For example, as shown in FIG. 13, the hub assembly 110 is rotated to account for one of the conductor lengths 22, 24 being angled relative to the other one of the conductor lengths 22, 24. The insulator may be centered or substantially centered in the hub cavity 193c (FIG. 8), even when the hub assembly 110 is rotated.

Referring to FIG. 14, the hub assembly 110 can be employed to selectively adjust an angle β between the first and second legs 120, 122 (or the longitudinal axes L1, L2 defined by the legs 120, 122). That is, the first leg 120 may be rotated in the directions N, O and/or the second leg 122 may be rotated in the directions P, Q. In some embodiments, the legs 120, 122 may be rotated relative to each other in either direction such that the angle β is between about 150 degrees (fully rotated) and about 180 degrees ("straight" configuration).

As noted above, the insulator engagement portion 210 is configured such that the cover assembly 100 can be used with different types of insulators. That is, the insulator engagement portion 210 is sized, shaped and configured to rest on top of insulators with a wide range of different diameters. Cover assemblies according to embodiments of the invention may be used with ANSI 55-2, 55-3, 55-4, 55-5, 55-6, 55-7, 56-1, 56-2 and 56-3 type insulators, for example. The standard for these insulators is ANSI C29.5-1984.

In some embodiments, the cover assembly 100 is compliant with electrical standard IEEE 1656-2010.

The cover assembly 100 may be installed on a "hot" or powered line using a hot stick. The hook loop 166 (FIG. 5) is provided in a balanced, centered location to facilitate installation with a hot stick hook (e.g., a shotgun style hot stick hook).

The lip 144 (FIG. 5) overlaps both the first and second hub members 112, 114. As a result, there is no vertical seam through which water or debris may enter. It is contemplated that a portion of the hub assembly 110 (e.g., the top wall 140 of the first hub member 112) could be domed or pitched to facilitate water runoff.

The rotatable nature of cover assemblies according to embodiments of the invention may allow the use of more rigid materials than other solutions (e.g., corrugated or bendable covers). This may provide increased durability and a longer lifetime for the cover assembly. The hub members 112, 114 and/or the extension arms 130, 132 may be formed of a rigid or semi-rigid polymeric material (e.g., a track resistant, insulating grade, UV stable polymer). In some embodiments, a high density polyethylene material is used to form the hub members 112, 114 and/or the extension arms 130, 132. In some embodiments, a co-polymer is used to form the hub members 112, 114 and/or the extension arms 130, 132.

In some embodiments, the hub assembly 110 has a length L3 (FIG. 4) of between about 16 and 32 inches and, in some embodiments, a length L3 of about 24 inches. In some embodiments, the central hub portions 116, 118 define a "hub diameter" D3 (FIG. 4) of between about 7.75 and 8.25 inches and, in some embodiments, a diameter D3 of about 8 inches.

In some embodiments, each extension arm 130, 132 has a length L4 (FIG. 3) of between about 12 to 36 inches and, in some embodiments, a length L4 of about 16.5 inches. In some embodiments, each arm 130, 132 has a width of W4 or W5 (FIG. 3) of between about 2.5 and 6.5 inches and, in some embodiments, a width of W4 or W5 of about 4.5 inches. In some embodiments, each arm 130, 132 has a height H4 (FIG. 2) of between about 1.25 and 7.25 inches and, in some embodiments, a height H4 of about 4.25 inches.

Figure 15:
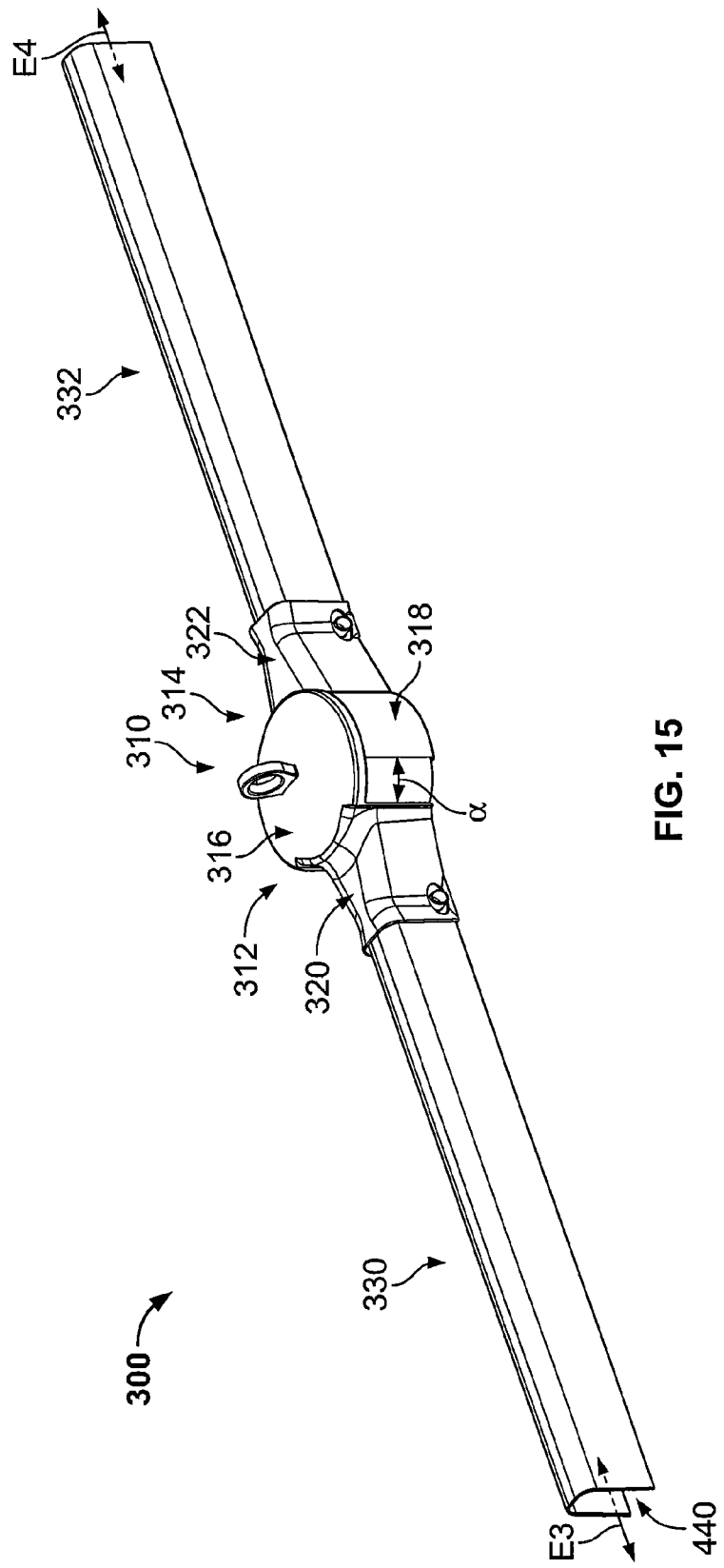
FIG. 15 is a perspective view of a cover assembly according to some other embodiments of the present invention.

A protective cover assembly 300 according to some other embodiments is illustrated in FIG. 15. The cover assembly 300 includes many of the same or similar features as the cover assembly 100. The primary differences between the cover assemblies 100 and 300 will be apparent from the description herein.

Figure 17:
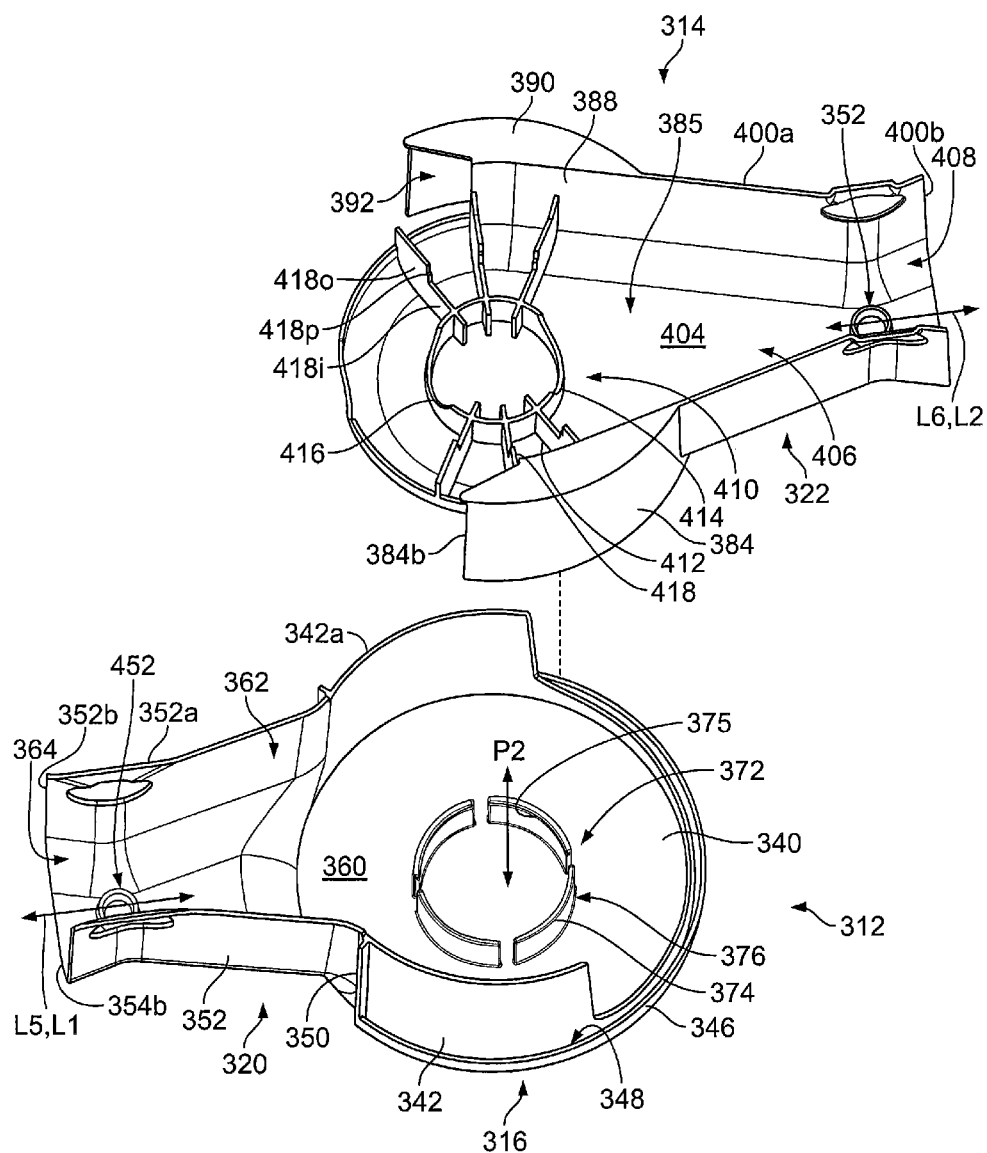
FIG. 17 is an exploded, bottom perspective view of the hub assembly of FIG. 15.

The cover assembly 300 includes a cover hub assembly 310 having a first hub member 312 and a second hub member 314. The first hub member 312 includes a central hub or central hub portion 316 and a laterally extending leg or leg portion 320. The leg 320 defines a longitudinal axis L5 (FIG. 17). The second hub member 314 includes a central hub or central hub portion 318 and a laterally extending leg or leg portion 322. The leg 322 defines a longitudinal axis L6 (FIG. 17). The axes L5, L6 may correspond to the axes L1, L2 described above in reference to the first and second hub members 112, 114 and may also be referred to as conductor exit axes C1, C2.

In some embodiments, the first and second hub members 312, 314 are discrete members. In some embodiments, the first and second hub members 312, 314 are separately formed.

An extension or extension arm 330 is connected to a distal end portion of the leg 320 and an extension or extension arm 332 is connected to a distal end portion of the leg 322. The extension arm 330 defines a longitudinal axis E3 and the extension arm 332 defines a longitudinal axis E4 (FIG. 15). The axes E3, E4 may correspond to the axes E1, E2 described above in reference to the extension arms 130, 132.

Figure 16:
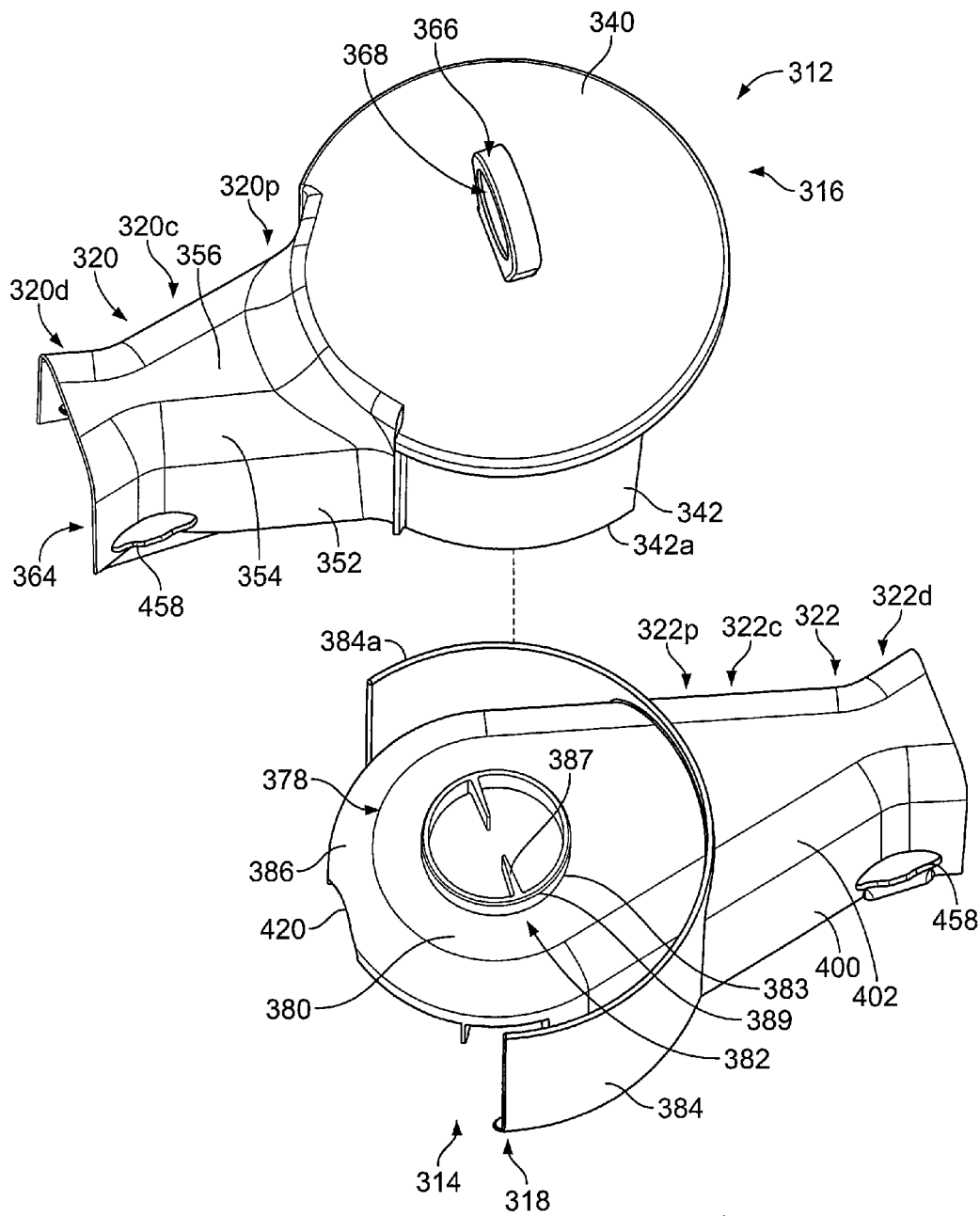
FIG. 16 is an exploded, top perspective view of a hub assembly of the cover assembly of FIG. 15.

The hub assembly 310 is shown in more detail in FIGS. 16 and 17. The central hub portion 316 of the first hub member 312 includes a top wall 340 and a pair of arcuate hub sidewalls 342 extending downwardly from the top wall 340. Each sidewall 342 has a lower edge 342a. A flange 346 extends downwardly from the top wall 340. The flange 346 defines an arcuate slot 348. A stop wall 350 is provided at each opposite end of the slot 348.

The leg portion 320 has a pair of spaced apart sidewalls 352. A connecting wall 354 connects top edges of the sidewalls 352. The sidewalls 352 and the connecting wall 354 define a cavity 360. Lower edges 352a of the sidewalls 352 define a lower opening 362 that communicates with the cavity 360. Ends 352b of the sidewalls 352 and an end 354b of the connecting wall 354 define an end opening 364 that also communicates with the cavity 360.

The leg portion 320 includes a proximal portion 320p adjacent the central hub portion 316, a central portion 320c adjacent the proximal portion 320p and a distal portion 320d adjacent the central portion 320c. The sidewalls 352 converge as they extend away from the central hub portion 116 at the proximal portion 320p and the central portion 320c. The sidewalls 352 diverge at the distal portion 320d of the leg 320.

The connecting wall 354 slopes downwardly away from the central hub portion 316 at the proximal portion 320p of the leg 320. The connecting wall 354 may be generally arcuate and/or may include a generally flat top portion 356 at the central portion 320c and/or the distal portion 320d of the leg 320.

A hot stick engagement feature 366 extends from an upper portion of the top wall 340 of the first hub member 312. The hot stick engagement feature 366 may include a loop defining an aperture 368 for receiving a portion of a hot stick such as an end or a hook of a hot stick. The hot stick engagement feature 366 may be centrally located on the top wall 340.

A first hub coupling feature 372 extends from a lower portion of the top wall 340 of the first hub member 312. A bottom surface of the top wall 340 from which the first hub coupling engagement feature extends may be generally flat. The first hub coupling feature 372 is sized and configured to engage with a second hub coupling feature of the second hub member 314, as will be described below. The first hub coupling feature 372 may include a plurality of arcuate walls 374 that extend downwardly from the top wall 340 with a gap or slot 376 defined between adjacent walls 374. A groove 375 is defined in an inner surface of each of the arcuate walls 374.

The arcuate walls 374 may be arranged in a generally circular pattern with a pivot axis P2 extending from the center of the circle and transverse to the bottom surface of the top wall 340. The first and second hub members can be rotatably coupled such that they rotate relative to one another about the pivot axis P2, as will also be described below. In some embodiments, the pivot axis P2 is transverse, and in some embodiments perpendicular, to the conductor exit axes C1, C2. In some embodiments, the pivot axis P2 is constrained to be transverse to the conductor exit axes C1, C2.

The central hub portion 318 of the second hub member 314 includes a ledge 378. The ledge 378 has a top wall 380 with a second hub coupling feature 382 thereon. The top wall 380 may be generally flat. The second hub coupling feature 382 is sized and configured to engage with the first hub coupling feature 372 of the first hub member 312. The second hub coupling feature 382 may include generally circular outer wall 383 and a plurality of inner support walls 387 extending inwardly from the outer wall 383. An annular lip is 389 is on an outer surface of the outer wall 383.

The arcuate walls 374 of the first hub coupling feature 372 and the outer wall 383 of the second hub coupling feature 382 may be sized and configured such that the arcuate walls 374 are received around the outer wall 383 when the first and second hub members 312, 314 are coupled. The lip 389 on the outer wall 383 of the second hub member 314 may be received in the grooves 375 of the arcuate walls 374 of the first hub member 312. In some embodiments, the first and second hub members 312, 314 are coupled with a snap fit or an annular snap fit using the grooves 375 and the lip 389. The gaps 376 between the arcuate walls 374 of the first hub member 312 may allow the arcuate walls 374 to have a limited amount of flexibility (while still being resilient) to facilitate fitting the arcuate walls 374 over and around the outer wall 383 of the second hub member 314.

The central hub portion 318 has a hub sidewall 384 that partially surrounds the ledge 378. The ledge 378 has a downwardly extending, generally arcuate sidewall 386. Inner sidewalls 388 extend downwardly from the ledge sidewall 386 on opposing sides of the ledge 378. A connecting wall or floor 390 connects each hub sidewall 384 with a respective one of the inner sidewalls 388. The hub sidewall 384, the inner sidewall 388 and the connecting wall 390 define an opening 392.

When the first and second hub members 312, 314 are connected, the hub sidewalls 342 of the first hub member 312 are received in the openings 392 of the second hub member 314. The first coupling feature 372 of the first hub member 312 engages with the second coupling feature 382 of the second hub member 314 as described above. The hub sidewall 384 of the second hub member 314 has a top end 384a that is received in the arcuate slot 348 of the first hub member 312. When connected, the first and second hub members 312, 314 (e.g., the central hub portions 316, 318) define a hub cavity similar to the hub cavity 193c of FIG. 8 and a hub opening that communicates with the hub cavity similar to the hub opening 193o of FIG. 8.

FIG. 15 illustrates the first and second hub members 312, 314 pivotably or rotatably connected to each other. As illustrated, the hub assembly 310 is in an aligned or straight configuration/position. That is, the longitudinal axis L5 defined by the leg 320 substantially coincides with the longitudinal axis L2 defined by the leg 322 (FIG. 17).

The first and second hub members 312, 314 can be slidably rotated relative to one another, e.g., to accommodate a conductor diverging from an insulator at various angles. Referring to FIG. 15, the hub assembly 310 can be rotated until one of the hub sidewall ends 384b of the second hub member 314 abuts or contacts one of the stop walls 350 of the first hub member 312 (FIG. 17). As illustrated, and like the hub assembly 110 described above, the hub assembly 310 can be rotated up to an angle α in either direction from the aligned or straight position (FIG. 15). Therefore, the legs 320, 322 and, when connected, the extension arms 330, 332 can be rotated relative to one another at any angle up to the angle α. In some embodiments, the angle α is between about 15 and 45 degrees. In some embodiments, the angle α is about 30 degrees.

The first and second hub members 312, 314 are rotatable such that the sidewalls 342 of the first hub member 312 and the sidewalls 384 of the second hub member 314 overlap throughout the entire range of rotation. The sidewalls 342, 384 define a cylinder with the exception of conductor openings 343, 385 (FIG. 17). With this configuration, there is no seam defined by or in the sidewalls through which water or debris may enter.

The second hub member 314 will now be described in more detail with reference to FIGS. 16 and 17. The leg 322 has a similar configuration to the leg 320 of the first hub member 312. The leg 322 has a pair of spaced apart sidewalls 400. A connecting wall 402 connects top edges of the sidewalls 400. As illustrated, the connecting wall 402 may be generally arcuate. The sidewalls 400 and the connecting wall 402 define a cavity 404. Lower edges 400a of the sidewalls 400 define a lower opening 406 that communicates with the cavity 404. Ends 400b of the sidewalls 400 and an end 402b of the connecting wall 402 define an end opening 408 that also communicates with the cavity 404.

The leg 322 includes a proximal portion 322p adjacent the central hub portion 318, a central portion 322c adjacent the proximal portion 322p and a distal portion 322d adjacent the central portion 322c. The sidewalls 400 converge as they extend away from the central hub portion 318 at the proximal portion 322p and the central portion 322c. The sidewalls 400 diverge at the distal portion 322d of the leg 322.

Referring again to FIG. 17, an insulator engagement portion 410 is provided in the central hub portion 318. The insulator engagement portion includes standoffs 412, 418 that extend downwardly from the top wall 380 of the ledge 378 (FIG. 16). The insulator engagement portion 410 includes a center standoff 412 that may be generally circular with a pair of opposed notches 414, 416 that are aligned along the axis L6 or in a direction parallel thereto. A plurality of outer standoffs 418 extend outwardly from the center standoff 412 to the ledge sidewall 386 (FIG. 16) and/or one of the inner sidewalls 388. The center standoff 412 and at least a portion of the outer standoffs 418 (e.g., an inner portion described below) may have a height that is substantially the same as a height of the ledge sidewall 386. Like the cover assembly 100 described above, the cover assembly 300 can be mounted on an insulator such that the insulator engagement portion 410 rests on a top portion or surface of the insulator. The standoffs 412, 418 provide clearance (e.g., an air gap) for a top running conductor (such as the conductor 20 shown in FIG. 2).

The standoffs 412, 418 are also sized, shaped and configured such that they will rest on insulators with a range of different diameters and/or shapes. In some embodiments, and as illustrated in FIG. 17, a respective outer standoff 418 has a generally stepped configuration with an inner portion 418i and an outer portion 418o. The outer portion 418o has a height that is greater than that inner portion 418i. For certain types of insulators, the inner portions 418i may rest on a top surface of a top portion of the insulator and the outer portions 418o may be adjacent and/or abut side surfaces of the top portion of the insulator.

A projection 418p may be between the inner and outer portions 418i, 418o of a respective outer standoff 418. The projection 418p may be positioned and configured such that the outer standoffs 418 further conform to particular shapes and types of insulators.

The ledge sidewall 386 has a notch 420 defined therein (FIG. 16). The notch 420 and the notches 414, 416 of the center standoff 412 are aligned along the axis L6 or in a direction parallel thereto (FIG. 17). When the hub assembly 310 is in the aligned or straight position (FIG. 15), the notches 414, 416, 420 are also aligned along the axis L5 or in a direction parallel thereto (FIG. 17). The notches 414, 416, 420 define a conductor channel similar to the conductor channel 222 described above in reference to the hub assembly 110. A conductor may extend through a portion of the conductor channel in certain conductor/insulator configurations, as described above in reference to FIGS. 11-13.

Figure 18:
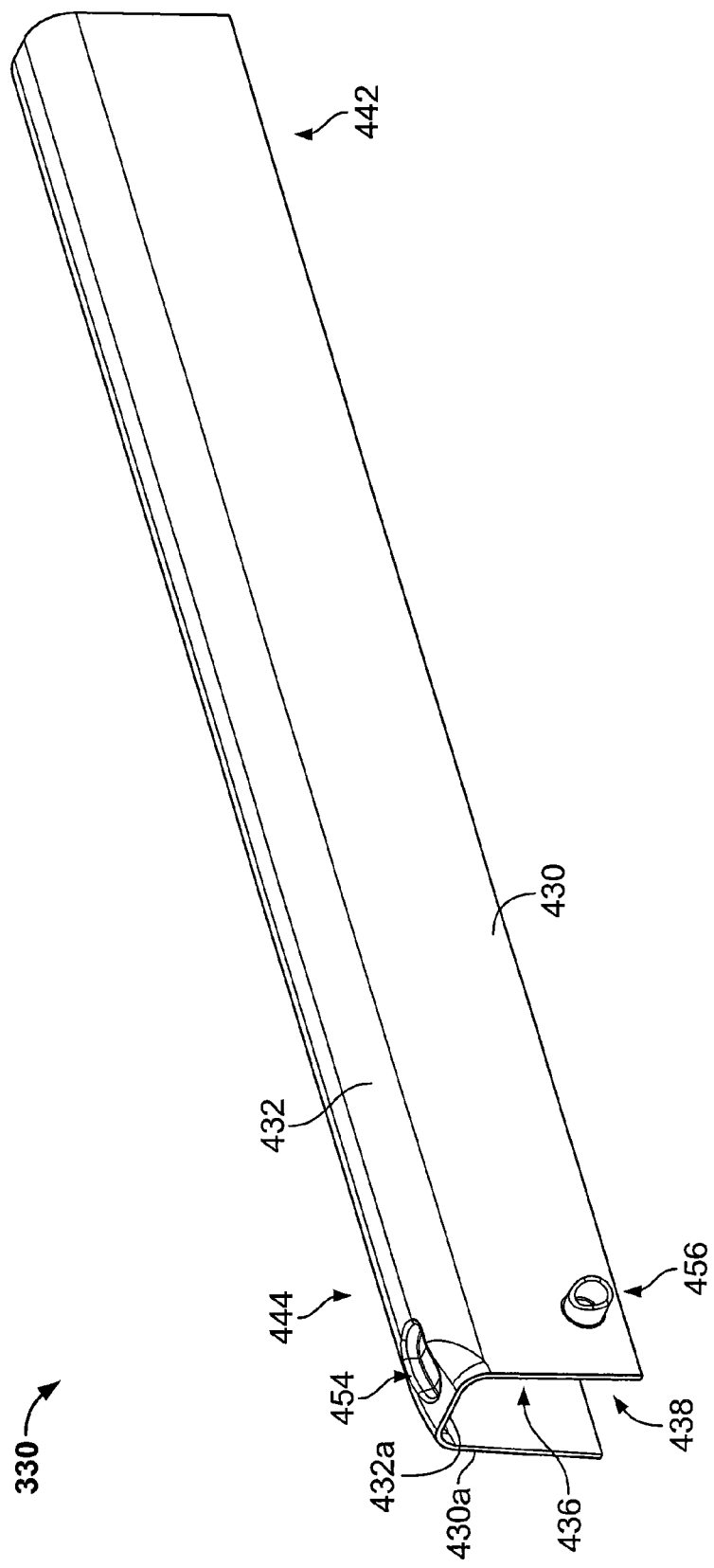
FIG. 18 is a perspective view of an extension arm of the cover assembly of FIG. 15.

The extension arms 330, 332 will now be described in more detail with reference to FIGS. 15 and 18. As illustrated, the arms 330, 332 are mirror images of one another and therefore only the arm 330 will be described in detail, it being understood that such description applies likewise to the arm 332. The arm 330 has a pair of opposed, spaced apart sidewalls 430 that generally extend along the axis E3, which may correspond to the axis E1 of the extension arm 130. A connecting wall 432 (e.g., an arcuate connecting wall) extends along the axis E3 and connects top edges of the sidewalls 430. The sidewalls 430 and the connecting wall 432 form a generally U-shaped channel 436 having a lengthwise bottom opening 438 and an end opening 440 at a distal portion 442 of the arm 330.

A recess 454 is defined in the connecting wall 432 at a proximal portion 444 of the arm 330. Referring to FIG. 17, a post or pin 452 extends downwardly from the leg portion 320 of the first hub member 312. The post 452 is received in the recess 454 of the extension arm 454 when the extension arm 330 is coupled to the first hub member 312.

A post or pin 456 extends outwardly from each sidewall 430 at the proximal portion 444 of the arm 330. Referring to FIG. 16, a slot 458 is defined in each sidewall 352 of the leg portion 320 of the first hub member 312. The post 456 of the extension arm 330 is received in the slot 458 when the extension arm 330 is coupled to the first hub member 312.

The post 452 received in the recess 454 and the posts 456 received the slots 458 allow for limited multi-dimensional movement or "play" between the coupled leg 320 and extension arm 330. In some embodiments, the post 452 defines a vertical pivot axis about which the arm can rotate or move in directions similar to the directions J and K shown in FIG. 14. In some embodiments, the posts 456 define a horizontal pivot axis about which the arm can rotate or move in directions similar to the directions L and M shown in FIG. 2.

As described above in reference to FIG. 17, the distal portion 320d of the leg 320 is flared (i.e., the sidewalls 352 diverge at the leg distal portion 320d). This allows the extension arm 330 to move side-to-side about the pivot axis defined by the post 452 of the first hub member 312.

The legs 320, 322 of the hub assembly 110 and/or the extension arms 130, 132 may include attachment features for attachment of conductor connectors such as displacement spring clip type connectors, omega clip type connectors, and the like that are known to those of skill in the art. Such connectors may also be integrated with the legs 320, 322 and/or the arms 330, 3u32.

The cover assembly 300 may be mounted on the insulator in the same or similar way as the cover assembly 100. The cover assembly 300 is moved downwardly such that a portion of the insulator 50 (FIG. 2) is received through the hub opening and into the hub cavity defined by the coupled hub members 312, 314. At least some of the standoffs 412, 418 rest on the insulator 50. Portions of the conductor lengths 22, 24 may also be received through the hub opening and into the hub cavity. More extant portions of the conductor lengths 22, 24 are received through the leg openings 362, 406 and into the leg cavities 360, 404. Where used, even more extant portions of the conductor lengths are received through the extension arm openings 438 and into the extension arm cavities 436.

As noted above, the conductor lengths 22, 24 may extend in different directions from the insulator 50. The cover assembly 300 can accommodate such configurations with the rotatable hub assembly 310. For example, the installer can rotate the hub assembly 310 prior to mounting the cover assembly 300. The hub assembly 310 may further rotate on its own as it is lowered onto the conductor/insulator. Where used, the posts 452 and 456, the recess 454 and the slots 458 may allow for additional multi-dimensional movement between the coupled leg 320 and extension arm 330. Thus, the hub assembly 310 and/or the extension arms 330, 332 may self-align during installation.

Also as noted above, the insulator engagement portion 410 is configured such that the cover assembly can be used with different types of insulators. That is, the insulator engagement portion 410 is sized, shaped and configured to rest on top of insulators with a wide range of different diameters. Cover assemblies according to embodiments of the invention may be used with ANSI 55-2, 55-3, 55-4, 55-5, 55-6, 55-7, 56-1, 56-2 and 56-3 type insulators, for example. The standard for these insulators is ANSI C29.5-1984.

In some embodiments, the cover assembly 300 is compliant with electrical standard IEEE 1656-2010.

The cover assembly 300 may be installed on a "hot" or powered line using a hot stick. The hot stick engagement feature 366 (FIG. 16) is provided in a balanced, centered location to facilitate installation with a hot stick end or hook.

The flange 346 overlaps both the first and second hub members 312, 314 and the hub sidewall 384 is received in the slot 348 defined by the flange 346 (FIG. 17). As a result, there is no vertical seam through which water or debris may enter. In addition, the top wall 340 of the first hub member 112 is domed or pitched to facilitate water runoff. That is, the hot stick engagement feature 366 is on a convex surface defined by the top wall 340.

As described above, the rotatable nature of cover assemblies according to embodiments of the invention may allow the use of more rigid materials than other solutions (e.g., corrugated or bendable covers). This may provide increased durability and a longer lifetime for the cover assembly. The hub members 312, 314 and/or the extension arms 330, 332 may be formed of a rigid or semi-rigid polymeric material (e.g., a track resistant, insulating grade, UV stable polymer). In some embodiments, a high density polyethylene material is used to form the hub members 312, 314 and/or the extension arms 330, 332. In some embodiments, a co-polymer is used to form the hub members 312, 314 and/or the extension arms 330, 332.

In some embodiments, the hub assembly 310 may have the same lengths as the hub assembly 110 described above in reference to FIG. 4. The central hub portions 316, 318 may have the same hub diameters as the central hub portions 116, 118 described above in reference to FIG. 4.

The extension arms 330, 332 may have the same lengths and/or widths as the extension arms 130, 132 described above in reference to FIG. 3. The arms 330, 332 may have the same heights as the arms 130, 132 described above in reference to FIG. 2.

Figure 19:
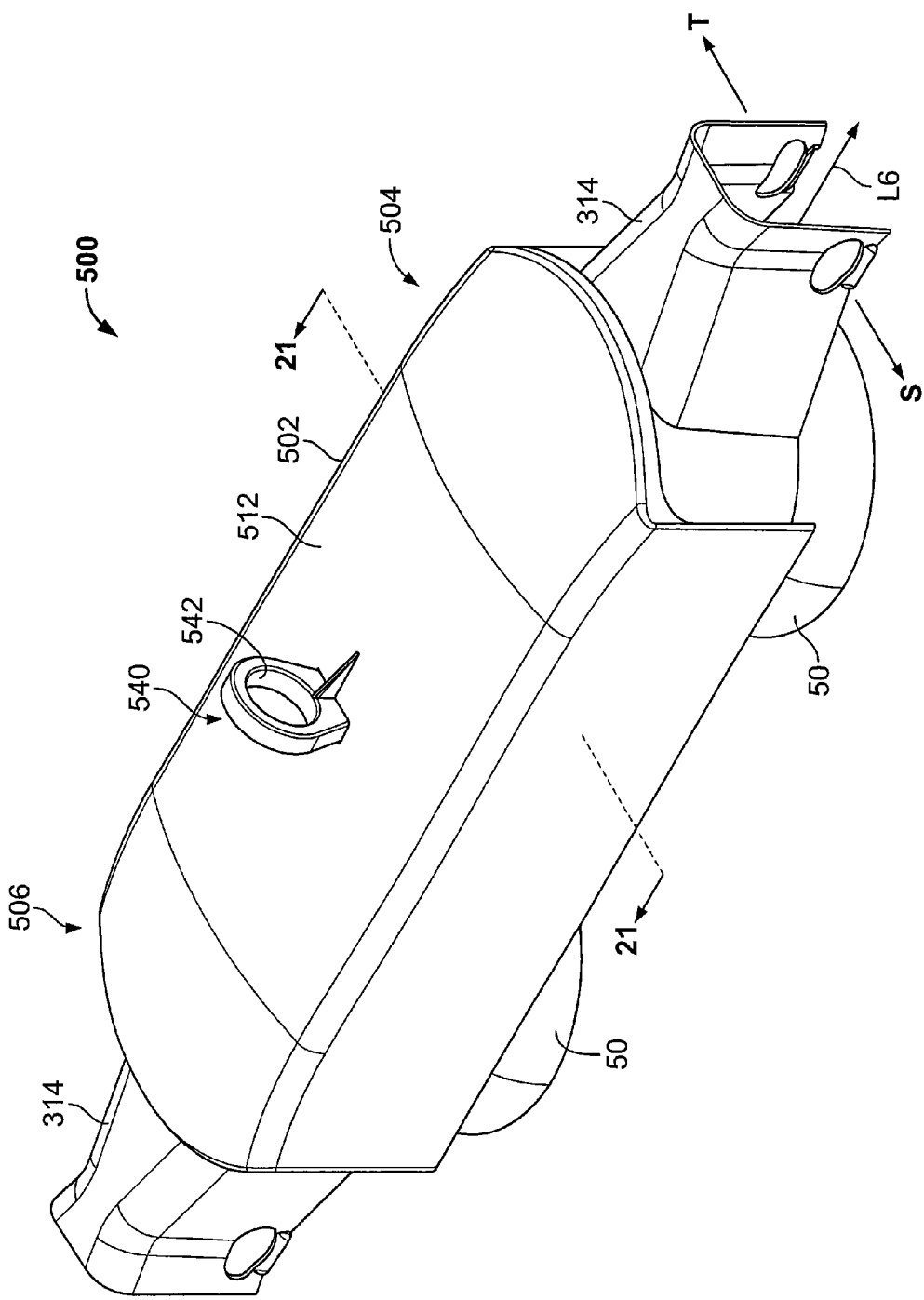
FIG. 19 is a perspective view of a cover assembly according to some other embodiments of the present invention.

A cover assembly 500 according to some other embodiments is illustrated in FIG. 19. The cover assembly 500 is configured to cover two spaced apart insulators 50 and portions of conductor(s) extending therefrom.

The cover assembly 500 includes an outer cover or housing 502. One of the hub members 314 is rotatably coupled to the housing 502 at each opposite end portion 504, 506 thereof.

Figure 20:
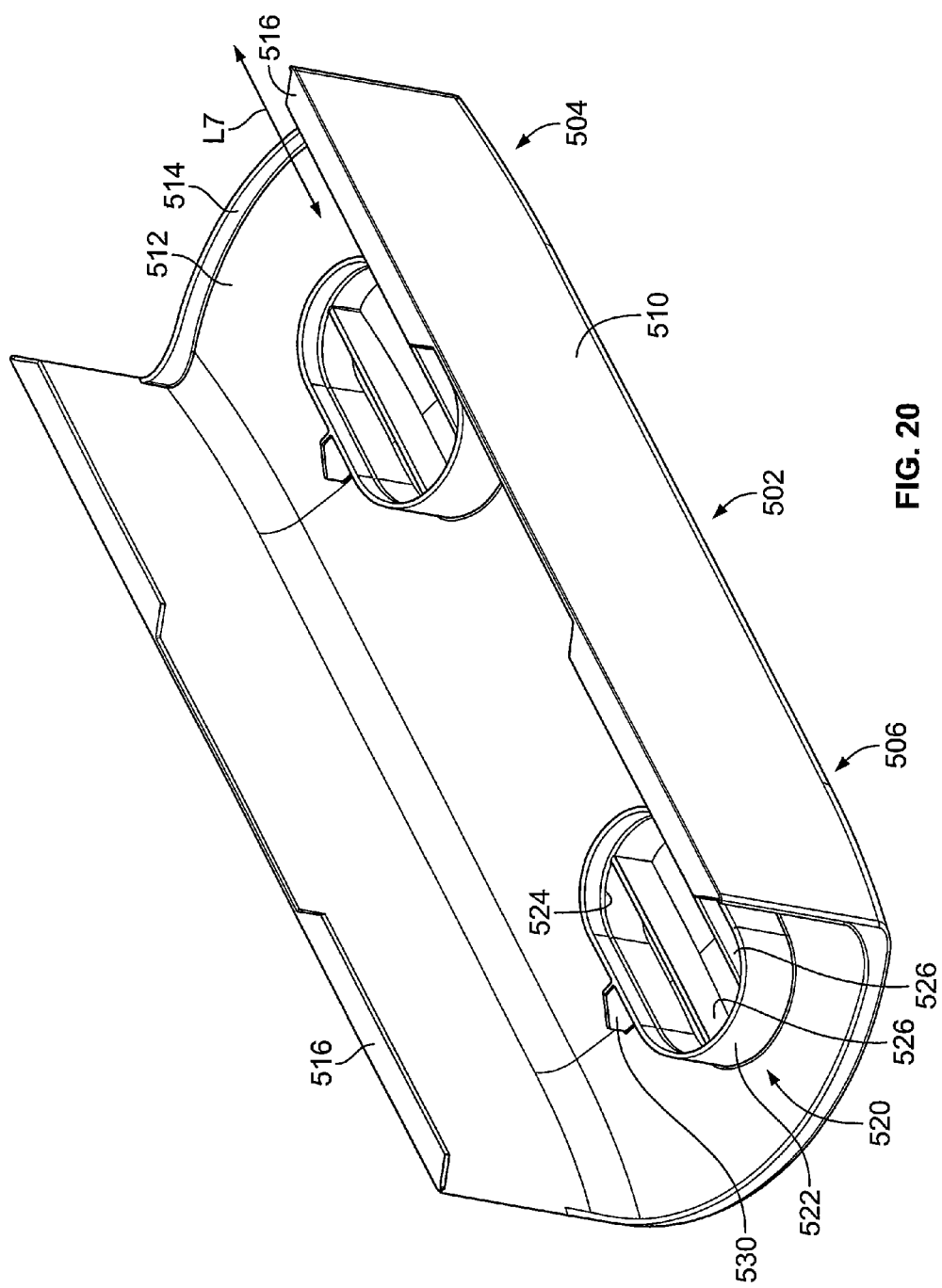
FIG. 20 is a bottom perspective view of an outer housing of the cover assembly of FIG. 19.

The housing 502 is illustrated in detail in FIG. 20. The housing 502 is elongated and defines a longitudinal axis L7. The housing 502 includes a pair of spaced apart sidewalls 510. A connecting or top wall 512 connects top edges of the sidewalls 510. A generally arcuate end wall 514 is at each end of the connecting wall 512. A lower ledge 516 extends from a bottom edge of each sidewall 510 at each of the first and second end portions 504, 506 of the housing 502.

A hub member coupling feature 520 is at each of the first and second end portions 504, 506 of the housing 502. The hub coupling feature 520 includes a generally elliptical wall 522 that extends downwardly from the top wall 512. A groove or track 524 is defined in an inner surface of the elliptical wall 522. A pair of spaced apart support walls 526 are within the elliptical wall and extend generally parallel to the longitudinal axis L7.

Although only one is visible in FIG. 20, a stop wall 530 extends from each opposite side of the elliptical wall 522. The stop walls 530 extend generally perpendicular to the longitudinal axis L7.

With reference to FIGS. 16, 17, 20 and 21, the hub assembly 314 may be rotatably coupled to the housing 502 as described below. The lip 389 of the hub member 314 (FIG. 16) is received (e.g., slidably received) in the groove or track 524 of the housing 502 (FIG. 20). The support walls 387 of the hub member 314 (FIG. 16) may be received in the spaces between the support walls 526 and the elliptical wall 522 of the housing 502 (FIG. 20). For example, with the hub member 314 in the "straight" position shown in FIG. 19, the distal end of a respective one of the support walls 387 may be adjacent and/or abut a respective one of the support walls 526. In the straight position, the hub member longitudinal axis L6 (FIG. 19) generally coincides or is generally parallel to the housing longitudinal axis L7 (FIG. 20).

A portion of the hub sidewall top end 384a (FIG. 16) is adjacent and/or slidingly engages the end wall 514 of the housing 502 (FIG. 20). Portions of the hub sidewalls 384 are adjacent and/or slidingly engage the housing sidewalls 510. A bottom portion of the hub sidewall 384 and/or one of the connecting walls or floors 390 rests on and/or is slidable on a respective one of the ledges 516 of the housing 502.

With the hub member 314 and the housing 502 coupled in this way, the hub member 314 is slidably rotatable relative to the housing 502. Specifically, with reference to FIG. 19, the hub member 314 may be rotated in opposite directions S and T such that an angle is formed between the hub member longitudinal axis L6 and the housing longitudinal axis L7 (FIG. 20).

The hub member 314 may be rotated until an end 388b of the hub inner sidewall 388 (FIG. 17) contacts one of the stop walls 530 of the housing 502 (FIG. 20). In various embodiments, the hub member 314 may be rotated in either direction S and T such that an angle between the longitudinal axes L6 and L7 is between about Q and about 45 degrees, between about 0 and 30 degrees and between about 0 and 15 degrees. The hub coupling feature 382 (FIG. 16) of the hub member 314 may translate in the hub coupling feature 520 of the housing 502 in a direction generally parallel to the housing longitudinal axis L7 as well as rotate about a vertical axis in the directions S and T. In some embodiments, the hub coupling feature 382 of the hub member 314 translates in the hub coupling feature 520 of the housing 502 up to about 2 inches.

The cover assembly 500 may be useful with closely spaced apart insulators and/or for certain conductor/insulator configurations, such those as described above in reference to FIGS. 11-13. In some embodiments, the cover assembly 500 can accommodate insulators that are spaced apart about 10 to 14 inches. One or both of the hub members 514 may be rotated to accommodate different insulator/conductor configurations for one or both of the insulators 50. Also, the extension arms 330, 332 may be connected to the hub members 514 in the manner described above in reference to the cover assembly 300.

Referring to FIG. 19, a hot stick engagement feature 540 may be provided on a top surface of the housing top wall 512. An aperture 542 may be defined in the hot stick engagement feature 540, with the aperture sized and configured to receive a portion of a hot stick such as an end or a hook of a hot stick. The hot stick engagement feature 54Q may be provided in a balanced, centered location to facilitate installation with the hot stick.

An upper surface of the housing top wall 512 may be domed or sloped to facilitate water runoff. For example, the top wall 512 may slope away from the hot stick engagement feature 540 in opposite directions parallel to the housing longitudinal axis L7 and/or in opposite directions transverse to the housing longitudinal axis L7 (FIG. 20).

Figure 21:
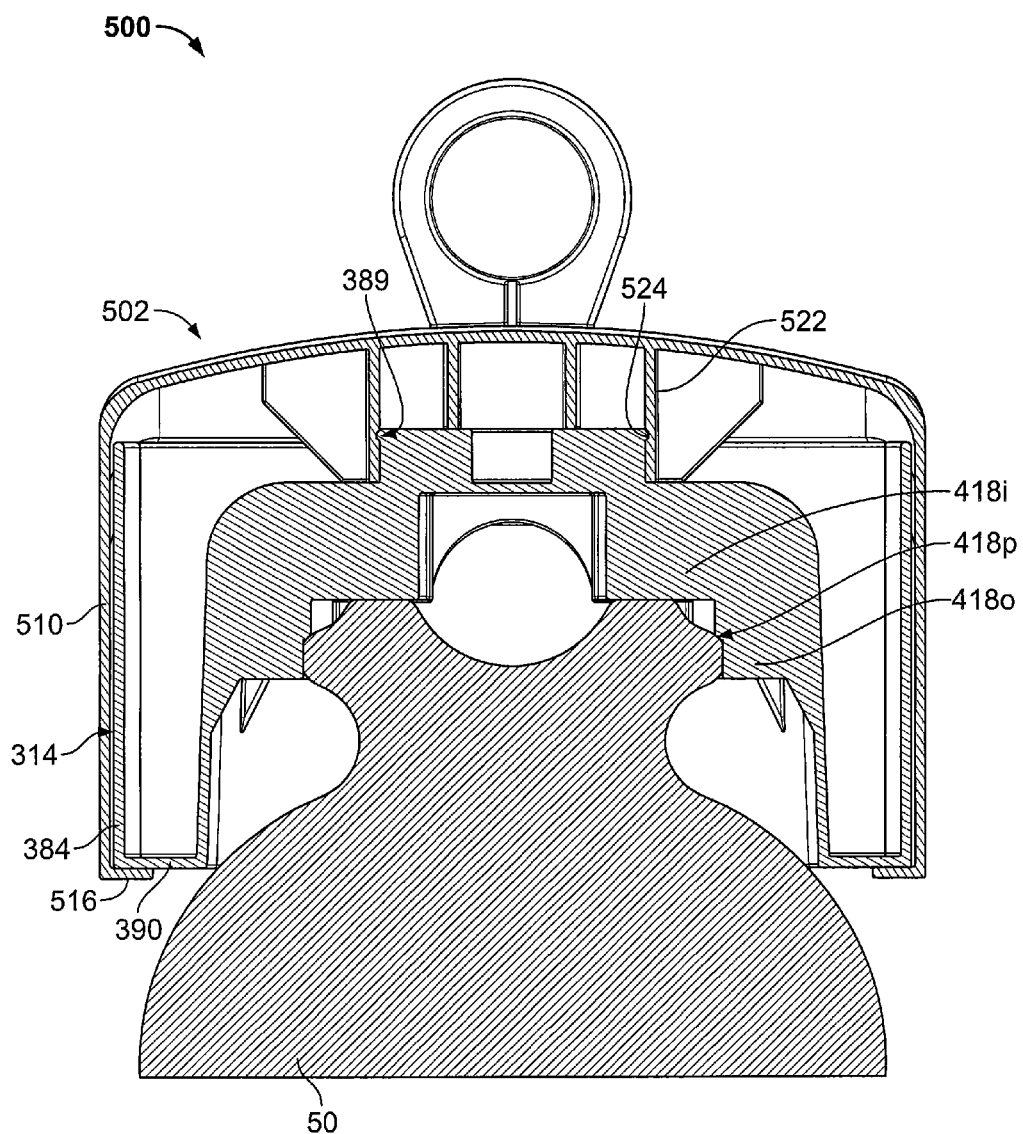
FIG. 21 is a sectional view of the cover assembly of FIG. 19 installed on an insulator.

FIG. 21 also illustrates the standoff features of the hub member 314 that may be useful with a variety of different kinds or shapes of insulators. The standoff inner portion 418i may rest on a top surface of the insulator. The standoff outer portion 418o and/or the standoff projection 418p may be adjacent and/or abut a side surface of a top portion of the insulator 50.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A cover assembly for an insulator and first and second conductor portions extending therefrom, the cover assembly comprising:
    first and second coupled hub members defining a central cavity sized and configured to receive the insulator, the first hub member comprising a first leg defining a first lengthwise cavity extending from the central cavity and configured to receive the first conductor portion, the second hub member comprising a second leg defining a second lengthwise cavity extending from the central cavity and configured to receive the second conductor portion;
    wherein the first and second hub members are configured to be slidably rotated relative to one another to selectively adjust an angle between the first and second legs;
    wherein a top wall of the first hub member is coupled to a top wall of the second hub member with the coupled top walls overlying the central cavity.

2. The cover assembly of claim 1 wherein the second hub member comprises a plurality of standoff members extending downwardly from the top wall, at least some of the standoff members configured to rest on the insulator.

3. The cover assembly of claim 2 wherein at least some of the standoff members comprise an inner portion and an outer portion, and wherein the outer portion extends downwardly from the top wall a greater distance than the inner portion.

4. The cover assembly of claim 2 wherein the standoff members include aligned notches defined therein, the notches defining a conductor passageway through which the first and second conductor portions can pass.

5. The cover assembly of claim 1 wherein the first hub member comprises a hot stick engagement feature centered on a top surface of the top wall.

6. The cover assembly of claim 5 wherein the top surface of the top wall is convex relative to the hot stick engagement feature.

7. The cover assembly of claim 1 wherein the first and second hub members each comprise an arcuate sidewall, and wherein the sidewalls overlap as the first and second hub members are slidably rotated relative to one another.

8. The cover assembly of claim 1 further comprising a first extension arm connected to a distal end portion of the first leg, the first extension arm defining a lengthwise cavity configured to receive the first conductor portion.

9. The cover assembly of claim 8 wherein the first extension arm cavity defines a longitudinal axis, and wherein the first extension arm is connected to the first leg with a coupling mechanism configured such that the first extension arm can be selectively rotated relative to the first leg about at least one pivot axis that is generally transverse to the longitudinal axis.

10. The cover assembly of claim 8 further comprising a second extension arm connected to a distal portion of the second leg, the second extension arm defining a lengthwise cavity configured to receive the second conductor portion.

11. The cover assembly of claim 1 wherein the first and second hub members are configured to be slidably rotated relative to one another to selectively adjust an angle between the first and second legs that is between about 150 degrees and 180 degrees.

12. The cover assembly of claim 1 wherein the first and second hub members are each unitarily formed.

13. A cover assembly for an insulator and first and second conductor portions extending therefrom, the cover assembly comprising:
    first and second coupled hub members defining a central cavity sized and configured to receive the insulator, the first hub member comprising a first leg defining a first lengthwise cavity extending from the central cavity and configured to receive the first conductor portion, the second hub member comprising a second leg defining a second lengthwise cavity extending from the central cavity and configured to receive the second conductor portion;
    wherein the first and second hub members are configured to be slidably rotated relative to one another to selectively adjust an angle between the first and second legs;
    wherein the first and second hub members each comprise an arcuate sidewall, and wherein the sidewalls overlap as the first and second hub members are slidably rotated relative to one another;
    wherein the first hub member comprises a flange defining an arcuate groove, and wherein a top portion of the sidewall of the second hub member is received in the groove.

14. The cover assembly of claim 13 wherein a top wall of the first hub member is coupled to a top wall of the second hub member with the coupled top walls overlying the central cavity.

15. The cover assembly of claim 13 wherein the first hub member comprises a stop wall at each opposite end of the groove, and wherein the first and second hub members are slidably rotatable relative to one another until an end portion of the sidewall of the second hub member contacts one of the stop walls of the first hub member.

16. A cover assembly for first and second spaced apart insulators, the assembly comprising:
    an elongated housing;
    a first hub member rotatably coupled to a first end portion of the housing, the first hub member comprising a first hub cavity sized and configured to receive the first insulator, the first hub member further comprising a first leg defining a first lengthwise cavity extending from the first hub cavity and configured to receive a first conductor portion extending from the first insulator; and
    a second hub member rotatably coupled to a second, opposite end portion of the housing, the second hub member comprising a second hub cavity sized and configured to receive the second insulator, the second hub member further comprising a second leg defining a second lengthwise cavity extending from the second hub cavity and configured to receive a second conductor portion extending from the second insulator.

17. The cover assembly of claim 16 wherein the first and second hub members each comprise a plurality of standoff members in the hub cavity, wherein at least some of the standoff members of the first hub member are configured to rest on the first insulator, and wherein at least some of the standoff members of the second hub members are configured to rest on the second insulator.

18. The cover assembly of claim 16 wherein:
the housing defines a housing longitudinal axis;
the first hub member defines a first hub member longitudinal axis; and
the second hub member defines a second hub member longitudinal axis;
wherein the first hub member is configured to be slidably rotated relative to the housing to selectively adjust an angle between the first hub member longitudinal axis and the housing longitudinal axis;
wherein the second hub member is configured to be slidably rotated relative to the housing to selectively adjust an angle between the second hub member longitudinal axis and the housing longitudinal axis.

19. A cover assembly for an insulator and first and second conductor portions extending therefrom, the cover assembly comprising:
first and second coupled hub members defining a central cavity sized and configured to receive the insulator, the first hub member comprising a first leg defining a first lengthwise cavity extending from the central cavity and configured to receive the first conductor portion, the second hub member comprising a second leg defining a second lengthwise cavity extending from the central cavity and configured to receive the second conductor portion;
wherein:
the first and second hub members are configured to be slidably rotated relative to one another to selectively adjust an angle between the first and second legs;
the first and second hub members each comprise an arcuate sidewall;
the sidewalls overlap as the first and second hub members are slidably rotated relative to one another; and
the sidewalls are free of openings or seams defined therein.

* * * * *